US008243353B1

(12) United States Patent
Gutin et al.

(10) Patent No.: US 8,243,353 B1
(45) Date of Patent: Aug. 14, 2012

(54) HOLOGRAPHY-BASED DEVICE, SYSTEM AND METHOD FOR CODED APERTURE IMAGING

(75) Inventors: Mikhail Gutin, Albany, NY (US); Xu-Ming Wang, Albany, NY (US)

(73) Assignee: Applied Science Innovations, Inc., Troy, NY (US)

( * ) Notice: Subject to any disclaimer, the term of this patent is extended or adjusted under 35 U.S.C. 154(b) by 519 days.

(21) Appl. No.: 12/418,654

(22) Filed: Apr. 6, 2009

Related U.S. Application Data

(60) Provisional application No. 61/123,371, filed on Apr. 7, 2008.

(51) Int. Cl.
*G03H 1/22* (2006.01)
(52) U.S. Cl. ........................................ 359/21
(58) Field of Classification Search .......... 359/9, 10–11, 359/15–16
See application file for complete search history.

(56) References Cited

U.S. PATENT DOCUMENTS

| | | | |
|---|---|---|---|
| 4,146,295 A | 3/1979 | Fonrojet et al. | |
| 4,209,780 A | 6/1980 | Fenimore et al. | |
| 4,228,420 A | 10/1980 | Fenimore et al. | |
| 4,360,797 A | 11/1982 | Fenimore et al. | |
| 4,370,750 A | 1/1983 | Hoover | |
| 4,389,633 A | 6/1983 | Fenimore | |
| 4,521,688 A | 6/1985 | Yin | |
| 4,602,844 A | 7/1986 | Sirat et al. | |
| 4,830,485 A | 5/1989 | Penney et al. | |
| 4,891,844 A | 1/1990 | Kiri | |
| 5,036,546 A | 7/1991 | Gottesman et al. | |
| 5,099,128 A | 3/1992 | Stettner | |
| 5,606,165 A | 2/1997 | Chiou et al. | |
| 5,627,639 A | 5/1997 | Mende et al. | |
| 5,737,075 A | 4/1998 | Koch et al. | |
| 5,757,005 A | 5/1998 | Callas et al. | |
| 5,821,541 A | 10/1998 | Tumer | |
| 5,930,314 A | 7/1999 | Lanza | |
| 5,940,468 A | 8/1999 | Huang et al. | |
| 6,163,391 A * | 12/2000 | Curtis et al. | 359/29 |
| 6,195,412 B1 | 2/2001 | Tobin, Jr. et al. | |
| 6,205,195 B1 | 3/2001 | Lanza | |
| 6,392,235 B1 | 5/2002 | Barrett et al. | |

(Continued)

FOREIGN PATENT DOCUMENTS

WO WO9514245 A1 5/1995

(Continued)

OTHER PUBLICATIONS

Applied Optics Article, vol. 43, No. 13 published May 1, 2004, entitled, "Phase plate to extend the depth of field of incoherent hybrid imaging systems" by Sherif, Cathey, and Dowski.*

(Continued)

*Primary Examiner* — Jennifer L. Doak
(74) *Attorney, Agent, or Firm* — Jay R. Yablon

(57) ABSTRACT

A system and related method for coded aperture sensing, comprising: passing at least one scene wavefront from a target scene through at least one original coded aperture mask onto a focal plane array, producing a diffracted projection of the target scene; and processing the diffracted projection into a representation of the target scene by correlating a function of the diffracted projection with a function of a known array pattern of the at least one original coded aperture mask and by using at least one reconstructing wavefront for holographic reconstructing.

72 Claims, 13 Drawing Sheets

U.S. PATENT DOCUMENTS

| | | |
|---|---|---|
| 6,580,939 B1 | 6/2003 | Chaney et al. |
| 6,583,420 B1 | 6/2003 | Nelson et al. |
| 6,737,652 B2 | 5/2004 | Lanza et al. |
| 6,822,237 B2 | 11/2004 | Inoue et al. |
| 7,094,203 B2 | 8/2006 | Inoue et al. |
| 7,136,453 B2 | 11/2006 | Jupp et al. |
| 7,260,251 B2* | 8/2007 | Dowski et al. .................. 382/128 |
| 7,283,232 B2 | 10/2007 | Brady et al. |
| 7,301,625 B2 | 11/2007 | Brady et al. |
| 7,336,353 B2 | 2/2008 | Brady et al. |
| 2004/0218714 A1 | 11/2004 | Faust |
| 2005/0030625 A1* | 2/2005 | Cattin-Liebl .................. 359/560 |
| 2006/0108509 A1 | 5/2006 | Frangioni et al. |
| 2006/0157640 A1 | 7/2006 | Perlman et al. |
| 2006/0261278 A1 | 11/2006 | Accorsi |
| 2007/0030955 A1 | 2/2007 | Eilbert et al. |
| 2007/0040124 A1 | 2/2007 | Accorsi et al. |
| 2007/0081200 A1 | 4/2007 | Zomet et al. |
| 2007/0263914 A1 | 11/2007 | Tibbetts |
| 2007/0296965 A1 | 12/2007 | Brady et al. |
| 2008/0001069 A1 | 1/2008 | Perlman et al. |
| 2008/0088841 A1 | 4/2008 | Brady |
| 2008/0095298 A1 | 4/2008 | Shefsky |
| 2008/0118181 A1 | 5/2008 | Potuluri et al. |
| 2008/0128625 A1 | 6/2008 | Lamadie et al. |
| 2009/0147238 A1* | 6/2009 | Markov et al. ................... 356/3 |

FOREIGN PATENT DOCUMENTS

| | | |
|---|---|---|
| WO | WO9609560 A1 | 3/1996 |
| WO | WO9726557 A1 | 7/1997 |
| WO | WO9745755 A1 | 12/1997 |
| WO | WO9820366 A1 | 5/1998 |
| WO | WO9846007 A1 | 10/1998 |
| WO | WO0054073 A1 | 9/2000 |
| WO | WO0212923 A1 | 2/2002 |
| WO | WO02056055 A2 | 7/2002 |
| WO | WO2002056055 A3 | 7/2002 |
| WO | WO2004098260 A2 | 11/2004 |
| WO | WO2004098260 A3 | 11/2004 |
| WO | WO2004104513 A2 | 12/2004 |
| WO | WO2004104513 A3 | 12/2004 |
| WO | WO2005086818 A2 | 9/2005 |
| WO | WO2005086818 A3 | 9/2005 |
| WO | WO2005088264 A1 | 9/2005 |
| WO | WO2006078537 A2 | 7/2006 |
| WO | WO2006078537 A3 | 7/2006 |
| WO | WO2006078687 A2 | 7/2006 |
| WO | WO2006078687 A3 | 7/2006 |
| WO | WO2006111678 A1 | 10/2006 |
| WO | WO2006123119 A1 | 11/2006 |
| WO | WO2006125975 A1 | 11/2006 |
| WO | WO2006133248 A2 | 12/2006 |
| WO | WO2006133248 A3 | 12/2006 |
| WO | WO2007047732 A2 | 4/2007 |
| WO | WO2007047732 A3 | 4/2007 |
| WO | WO2007054769 A2 | 5/2007 |
| WO | WO2007054769 A3 | 5/2007 |
| WO | WO2007091038 A1 | 8/2007 |
| WO | WO2007091045 A1 | 8/2007 |
| WO | WO2007091047 A1 | 8/2007 |
| WO | WO2007091049 A1 | 8/2007 |
| WO | WO2007091051 A1 | 8/2007 |
| WO | WO2007121417 A2 | 10/2007 |
| WO | WO2008012557 A2 | 1/2008 |
| WO | WO2008021830 A2 | 2/2008 |
| WO | WO2008021830 A3 | 2/2008 |
| WO | W02008064278 A2 | 5/2008 |
| WO | WO2008064278 A3 | 5/2008 |
| WO | WO2008108840 A1 | 9/2008 |
| WO | W02008133957 A1 | 11/2008 |
| WO | WO2008133958 A1 | 11/2008 |
| WO | WO2008133959 A1 | 11/2008 |
| WO | WO2008134757 A1 | 11/2008 |
| WO | WO2008142543 A1 | 11/2008 |
| WO | WO2008148525 A1 | 12/2008 |

OTHER PUBLICATIONS

A. Busboom, H. Elders-Boll and H. D. Schotten, Uniformly Redundant Arrays, Experimental Astronomy, vol. 8, No. 2 (Jun. 1998) pp. 97-123.

Tim Clark and Esko Jaska, DARPA Interest in Diffractive Sensors, Proc. of SPIE vol. 6714, 671403, (2007).

C.W. Slinger, M. Eismann, N. Gordon, K. Lewis, G. McDonald, M. McNie, D. Payne, K. Ridley, M. Strens, G. De Villiers, R. Wilson, An investigation of the potential for the use of a high resolution adaptive coded aperture system in the mid-wave infrared, Proceedings of the SPIE, vol. 6714, pp. 671408 (2007).

McNie, King, Price, et. A large area reconfigurable MOEMS microshutter array for coded aperture imaging systems. Proceedings of the SPIE, vol. 7096, pp. 70960D-70960D-8 (2008).

Slinger, Gilholm, Gordon, et. Adaptive coded aperture imaging in the infrared: towards a practical implementation, Proceedings of the SPIE, vol. 7096, pp. 709609-709609-8 (2008).

* cited by examiner

HOLOGRAPHY-BASED DEVICE, SYSTEM AND METHOD FOR CODED APERTURE IMAGING

CROSS REFERENCE TO RELATED APPLICATIONS

This application claims benefit of U.S. Provisional application 61/123,371 filed Apr. 7, 2008.

STATEMENT REGARDING FEDERALLY SPONSORED RESEARCH OR DEVELOPMENT

This invention was supported, in whole or in part, by contracts W911QX09C0039 from the United States Army RDE-COMAC, N68335-08-C-0557 from the United States Naval Air Warfare Center, and FA9453-09-M-0103 from the United States Air Force Research Laboratory. The Government has certain rights in the invention.

FIELD OF THE INVENTION

The invention relates to coded-aperture imaging, in particular to diffractive coded-aperture imaging which can be effectively applied in spectral ranges where diffraction may have significant effect, including ultraviolet through infrared and longer-wavelength spectral ranges.

BACKGROUND OF THE INVENTION

Coded apertures have been used in astronomical imaging for a number of years. In these applications, imaging is performed in very short-wave spectral ranges, such as X-rays, where diffraction is negligible.

When coded-aperture imaging is attempted in the infrared spectral range, the effect of diffraction is significant and may pose a problem. Such imaging in the presence of diffraction is of practical interest. (Tim Clark and Esko Jaska, *DARPA Interest in Diffractive Sensors*, Proc. of SPIE Vol. 6714, 671403, (2007))

Diffraction causes a blur in image on the focal plane array (FPA). Slinger et al. used an approach to deblurring the image in the process of coded-aperture decoding, with Fourier deconvolution and noise reduction by Tikhonov regularization on multiple captured FPA frames (C. W. Slinger, M. Eismann, N. Gordon, K. Lewis, G. McDonald, M. McNie, D. Payne, K. Ridley, M. Strens, G. De Villiers, R. Wilson, *An investigation of the potential for the use of a high resolution adaptive coded aperture system in the mid-wave infrared*," Proc SPIE 6714-07 (2007) and C. W. Slinger, G. D. De Villiers, D. A. Payne, *Processing method for coded aperture imaging*, WO 2007/091049).

A different approach disclosed in a PCT publication by Slinger (C. W. Slinger, Imaging System, WO 2007/091051) uses a coded diffractive mask designed such that its diffraction pattern at the waveband of interest is a well-conditioned coded intensity pattern having a strong autocorrelation function with low sidelobes. Radiation reaching the detector array is diffracted by the diffractive mask but in a defined way, and it is the diffraction pattern of the mask which provides the coding. The scene image can then be reconstructed using the same techniques as for conventional coded aperture imaging but using the diffraction pattern of the mask as the aperture function. The diffractive coded aperture mask in Slinger's invention acts in effect as a hologram that is reconstructed by a plane wavefront from a distant target to produce a well-resolved coded pattern on the FPA. The well-resolved pattern is a traditional coded aperture pattern. The coded pattern on the FPA is then processed the same way as X-ray and other "diffraction-free" coded-aperture images.

It is known from holography that an aberration-free reconstructed image can only be produced when the reconstructing wavefront is of exactly the same nature as the reference wavefront that was used during the hologram recording. For example, if a plane wavefront is used as the reference for recording, a plane wavefront of exactly the same orientation during reconstruction is required to produce an aberration free image. If the reconstructing wavefront arrives at the hologram at a different angle, the image will be aberrated. This limits the field of view of the invention disclosed in WO 2007/091051, where different points of the field will produce different "reconstructing wavefronts" of the coded-aperture mask "hologram." Only for one look angle can the "hologram" mask be designed to produce an aberration-free array image on the FPA. At other look angles, aberrations may be significant, increasing with the deviation of the look angle from the design value, as well as with the aperture size of the "hologram" array mask.

Slinger's PCT publications WO/2007/091049, WO2007/091047, WO2006/125975, and WO/2007/091051 disclose an imaging system where the coded-aperture mask acts as a diffractive optical element, or hologram, so that radiation reaching the FPA, diffracted by the mask, produces a well-conditioned intensity pattern on the FPA, with strong autocorrelation and low sidelobes. As between 1) feature size of the diffracted pattern on the FPA and 2) FPA pixel pitch, the larger (coarser) of these two determines the angular resolution.

Slinger's invention is prone to aberrations at look angles substantially different from the look angle for which the diffractive mask is designed. For every different look angle, Slinger's imaging system in principle requires changing the diffractive pattern on the mask. Slinger's inventions produce intensity images; sensing the phase of an arriving wavefront is not provided.

Slinger's diffractive masks, due to their binary nature (transparent versus opaque, bit depth of 1), produce higher diffraction orders with noise-like stationary image artifacts. The use of low-noise sensors does not reduce this detrimental effect. This problem is mitigated by capturing and statistical treatment of multiple images of the same scene, with different, dynamically changing, adaptive mask patterns. This mitigation, however, requires complex adaptive masks (e.g., using micro-electromechanical, MEMS, devices), stationary objects that do not move between frames, and a stable platform on which the imaging system is installed.

Slinger's imaging, as described in these patent publications, also does not provide color information.

It is an object of this invention to provide a coded aperture imaging system with high imaging resolution in the visible and infrared spectral ranges, where there may be significant diffraction.

Another object of this invention is to achieve incident wavefront sensing, including amplitude and phase.

Another object of this invention is to remove aberrations caused by windows or optics present in the optical path preceding the aperture of the system.

Another object of this invention is to remove aberrations caused by atmospheric turbulence in the optical path preceding the aperture of the system.

Another object of this invention is to provide synthetic-aperture imaging with multiple sensing apertures jointly forming a high resolution image of a scene.

Another object of this invention is to provide a coded-aperture imaging system operable in the ultraviolet, visible, infrared, and longer-wavelength spectral ranges with a simplified coded aperture mask.

Another object of this invention is aberration-free imaging, over extremely wide fields of view, with a single coded-aperture mask.

Another object of this invention is to achieve diffractive coded-aperture imaging free of noise-like image artifacts.

Another object of this invention is to provide color, spectral, and hyperspectral sensing and imaging.

Another object of this invention is to provide three-dimensional imaging of objects.

Another object of this invention is to provide polarization-sensitive imaging and wavefront sensing.

Finally, another object of this invention is to provide coded-aperture imaging with automated detection of change.

SUMMARY OF THE INVENTION

This invention is a method of coded-aperture imaging which can be used effectively in the ultraviolet through infrared and longer-wavelength spectral ranges, in the presence of diffraction. The pattern formed by radiation diffracted on a coded-aperture mask, of a structure similar to that used in "diffraction-free" coded aperture imaging, is processed as a digital hologram, by means of digital holography. The digital-holographic processing results in a reconstructed wavefront which yields a high-resolution image of the scene.

In particular, what is disclosed is a system and related method for coded aperture sensing, comprising: passing at least one scene wavefront from a target scene through at least one original coded aperture mask onto a focal plane array, producing a diffracted projection of the target scene; and processing the diffracted projection into a representation of the target scene by correlating a function of the diffracted projection with a function of a known array pattern of the at least one original coded aperture mask and by using at least one reconstructing wavefront for holographic reconstructing.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Operating Principle

Figure 1:
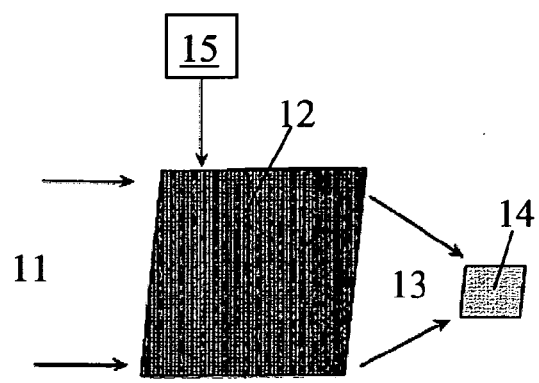
FIG. 1 is a schematic illustration of a basic layout of coded-aperture imaging in accordance with various embodiments of the invention.

FIG. 1 illustrates the basic layout of diffractive coded-aperture imaging. Light 11 from the scene arrives at the coded-aperture mask 12. If the scene is distant, its every point corresponds to an incident plane wavefront. If the scene is at a finite distance, the wavefronts are spherical. The incident light is diffracted on the coded-aperture mask 12. The diffracted light 13 is registered by the focal plane array (FPA) 14. The coded-aperture mask 12 may be adaptive, so that the aperture array may be controlled by a suitable controller 15. In sum: at least one scene wavefront from a target scene is passed through at least one coded aperture mask onto a focal plane array, producing a diffracted projection of the target scene.

The technical challenge addressed by this disclosure, is how to then make use of this diffracted projection to reconstruct the image of the target scene, especially for long wavelengths where diffraction may have a significant impact.

Introduction

This invention provides for imaging and wavefront sensing using a coded-aperture mask 12 which may include, without limitation, a uniformly redundant array similar to those used in coded-aperture imaging in astronomy (see, e.g., A. Busboom, H. Elders-Boll and H. D. Schotten, *Uniformly Redundant Arrays*, Experimental Astronomy, Volume 8, Number 2 (June 1998) pp. 97-123). Diffraction of light on the coded-aperture mask 12 array produces a pattern on a focal plane array 14. One or more sensed FPA patterns are captured and processed using holographic methods. The result of the processing is a high-resolution, diffraction-limited image of the scene and a reconstruction of the wavefront from the scene, including phase information.

This is in contrast to, for example, the Slinger methods, which replace the "traditional" coded aperture mask with a diffractive optical element (hologram) that would, for each point of a distant scene (plane wavefront, or "star"), produce the image of the traditional coded aperture mask on the sensor. In the invention disclosed herein, the "traditional" coded aperture mask is substantially retained, and instead, the image falling on the focal plane array 14 is treated as a digital hologram.

Figure 2:
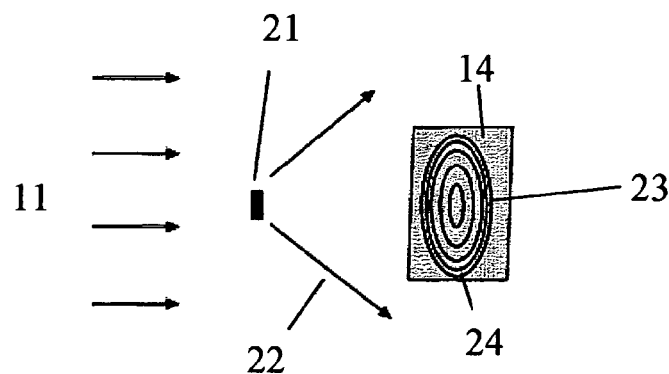
FIG. 2 is a schematic illustration of holographic recording of an incident plane wavefront.

Following is a simplified, introductory illustration of the operating principle of this invention. Referring to FIG. 2, consider an aperture mask 21 in the shape of a small obscuration ("dust particle"). The incident light 11 is taken to be an incident plane wavefront from a point of the distant scene to be recorded (target scene, not explicitly shown), and this is scattered by the small obscuration, forming a scattered spherical wavefront 22. Most of the plane wavefront is not scattered, and instead propagates to the FPA 14 where it interferes with the scattered spherical wave. The result of the interference is the well-known concentric, intermittently dark and bright, Fresnel rings. The rings are spaced more sparsely near the center and are increasingly more frequent as the distance from the center increases. If the fringes 23 are registered on a photographic plate, the processed photographic plate, thereafter illuminated by an incident light, will act as a diffractive optical element, or holographic lens 24. If the fringes 23 are digitally recorded, then they can be used to represent a "virtual" holographic lens. Both approaches are envisioned here in various embodiments: use of real, physical optical elements and processes, and use of "virtual," digitally-represented optical elements and processes.

Figure 3:
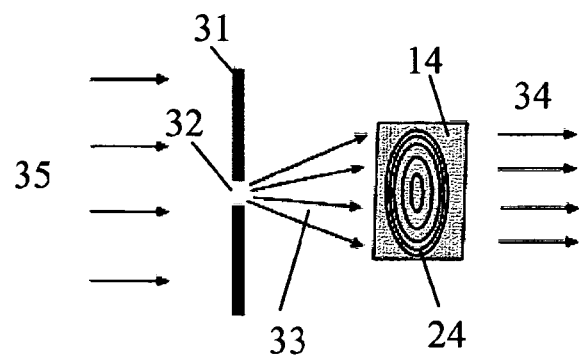
FIG. 3 is a schematic illustration of holographic reconstruction of an incident plane wavefront.

Referring to FIG. 3 with the incident light now taken to be an incident plane reconstructing wavefront 35 (which need not emanate from the scene being recorded and which may be virtually, digitally simulated), now consider an opaque screen or mask 31 with a small pinhole 32. The screen or mask 31 is complementary to the small obscuration 21 of FIG. 2, and is placed at the same distance from the FPA. That is, the space through which the incident light freely propagates in FIG. 2 is occupied by screen or mask 31 in FIG. 3, and the pinhole 32 through which the light propagates in FIG. 3 is occupied by the small 21 obscuration of FIG. 2. In other words, screen or mask 31 and small obscuration 21 are effectively the "negatives" of one another. The (real or virtual) reconstructing wavefront 35 passing through the pinhole forms a spherical wavefront 33, which is then collimated by the (real or virtual) holographic lens 24 that resulted from FIG. 2, into a reconstructed plane wavefront 34 which will turn out to be identical to the original incident plane wave of FIG. 2. Alternatively, the pattern captured by the FPA 14 can be digitally, virtually represented and illuminated by a spherical wave to digitally reconstruct the wavefront. The digitally-reconstructed wavefront will contain the proper phase information (tilt) of the original plane wavefront 11 from the target scene.

More generally, screen or mask 31 is a "function of" the known small obscuration 21, and in the illustration, this "function" is the "complement," which is the most straightforward function to employ and so is preferred but is not limiting. All that really is required, however, is that this function be a function other than the identify function, i.e., that 21 and 31 be known, different functions of one another.

If the angle of incidence of the plane wavefront at recording changes (e.g., because it is arriving from a different point of the scene), after reconstruction, the change in the wavefront tilt is faithfully reproduced.

Figure 4:
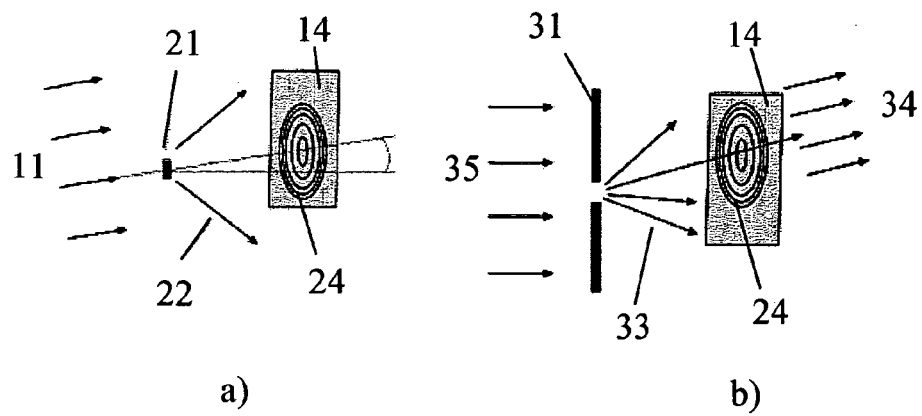
FIG. 4 is a schematic illustration of holographic a) recording of an incident tilted wavefront; and b) reconstruction of the tilted wavefront.

With this basic illustration in mind, a complex scene can be imaged in the same manner, since each point of the scene will be represented by a plane wavefront arriving at a unique angle, see FIG. 4.

If the target is at a finite distance, the above discussion remains valid, except that the captured and restored wavefront will be spherical, centered on a point of the target. As such, it does not matter if the object being imaged, i.e., target scene, is near or far.

The photographic plate can be replaced by a two-dimensional imaging sensor, or a focal plane array (FPA), including CCD, CMOS, or any other type of imaging sensor known or which may become known in the art to those of ordinary skill. The FPA may capture the holographic fringe pattern, producing its digital representation. The captured pattern (hologram) may be displayed on a spatial light modulator (SLM) and restored optically, using a laser. Alternatively and preferably, the hologram captured by the FPA may be reconstructed digitally, using established means of digital holography known in the art. Any of the existing algorithms known or which may become known in digital holography may be used for this reconstruction, including, without limitation, digital Fresnel propagation.

The above simplified example illustrates much of the basic operation of this invention: recording a diffraction pattern (hologram) produced by the light arriving from the scene and passing through a coded-aperture mask, which arrives at the FPA as a diffracted projection of the target scene, followed by reconstruction of the resulting hologram with a different (physical or digital) reconstructing wavefront, resulting from a mask that is complementary to (and more generally a known function of) the original coded-aperture mask used in recording the hologram.

Shown in FIGS. 2 and 3 are the incident wavefronts parallel to the FPA. If the wavefront is incident at an angle as in FIG.

4, the concentric fringes will shift on the FPA and change shape slightly. Still, at reconstruction, the spherical wave from the same pinhole of the complementary mask will be collimated by the hologram into an aberration-free plane wavefront, identical to the original incident wavefront which produced the hologram.

A complex wavefront arriving from the target scene can be presented as a sum of component plane wavefronts, each arriving from a point of the target scene. The above recording with a "dust particle" mask and reconstruction with the complementary pinhole mask will faithfully restore the entire complex wavefront.

Mathematically, the process of recording and reconstructing the coded-aperture hologram, and why this invention works, can be described as follows. Let the wavefront from the scene or target in the absence of the coded-aperture mask be $U_0$. $U_1$ and $U_2$ are the wavefronts after passing the "original" and "complementary" coded-aperture masks, respectively. Accordingly, the following holds true, for all spatial locations:

$$U_0 = U_1 + U_2 \quad (1)$$

The FPA registers intensity of the incident light, in the FPA plane, given by:

$$I_1 = (|U_1|)^2 \quad (2)$$

On the other hand, the same intensity can be expressed in terms of the field after the complementary mask:

$$I_1 = (|U_0 - U_2|)^2 = (|U_0|)^2 + U_0 \cdot \overline{U_2} + \overline{U_0} \cdot U_2 + (|U_2|)^2 \quad (3)$$

Here, $$\overline{U} = Re(U) - i \cdot Im(U) \quad (4)$$

is a complex conjugate.

The second and third terms of (3) are the "holographic" terms, capturing the incident wavefront $U_0$.

In the above discussion, relationships (1) and (3) are not trivial. Knowing the field at the FPA, diffracted by the complementary mask, which in turn, at reconstruction, defines diffraction on the hologram, requires knowing the wavefront from the target, $U_0$. In other words, knowing three patterns: 1) the diffraction pattern on the FPA with the original mask; 2) the diffraction pattern on the FPA from the complementary mask; and 3) the mask pattern, is equivalent to knowing three other values: 1) the phase, or tilt, of the wavefront from the target; 2) the diffraction pattern at the FPA from original mask; and 3) the mask pattern.

According to the above discussion, the intensity pattern on the FPA 14 is treated as a digital hologram, which is the result of interference of two wavefronts: 1) the wavefront arriving from the target scene, unobstructed, as if no mask was present between the target scene and the FPA 14; and 2) the same wavefront, modulated by the complementary mask, which is identical to the unobstructed wavefront from the scene at the transparent points of the original mask and completely absorbed at the opaque points of the complementary mask. The complementary mask is preferably the negative of the physical mask used in forming the physical intensity pattern on the FPA, i.e., the complementary mask is opaque in the points where the physical mask is transparent, and vice versa.

Reconstruction of the digital hologram by an unobstructed wavefront produces the wavefront (complex, with intensity and phase reconstructed) modulated by the complementary mask. Reconstruction of the digital hologram by the wavefront modulated by the complementary mask produces the unobstructed wavefront (complex, with intensity and phase reconstructed).

The patterns of the original and complementary masks are not limited to a single pinhole and single "dust particle," which are merely illustrative, simplified examples. The above discussion is equally applicable to any pattern of the mask.

Preferred Reconstruction

Preferred reconstruction is performed as illustrated by FIG. 4, which shows the incident light 11 from the target scene entering at a tilt in FIG. 4a. The reconstructing wavefront 35, after diffraction on the aperture of mask 31, becomes spherical wavefront 33, with the center located on-axis, at the distance equal to the distance between the coded-aperture masks 21, 31 and the FPA 14. The axis is defined as a line from the center of the FPA and normal to the FPA, pointing at the center of the scene, and so is horizontal in FIG. 4. For the point in the center of the scene, the reconstruction is shown in FIG. 4b. For a different point, the "holographic lens" created during recording will be de-centered, i.e., shifted, as illustrated, and its shape will differ from circular. The reconstructed wavefront will be plane, aberration-free, and tilted exactly as the original wavefront from the point of the scene.

Forming an image from the reconstructed plane wavefronts is performed with a "digital perfect lens" to digitally focus each plane wavefront into a point. Since the plane wavefronts are reconstructed with no aberrations, the resulting image is diffraction-free as well.

The reconstruction can be mathematically described as multiplication of the FPA intensity pattern by the complex field of the reconstructing wave, which is the field behind the (pinhole) mask complementary to the obscuration ("dust particle") mask used during recording (see equation (3)):

$$I_1 \cdot U_2 = (|U_0|)^2 \cdot U_2 + U_0 \cdot U_2 \cdot U_2 + \overline{U_0} \cdot U_2 \cdot U_2 + (|U_2|)^2 \cdot U_2 \quad (5)$$

The second term on the right-hand side is the reconstructed original wavefront (see equation (4)):

$$U_0 \cdot \overline{U_2} \cdot U_2 = U_0 \cdot (|U_2|)^2 \quad (6)$$

It is the complex field $U_0$ at the FPA, multiplied by the scalar (intensity) value $(|U_2|)^2$ of the illumination of the FPA by the reconstructing wave, which is the field behind the complementary mask, $U_2$. The first and the last terms in (5) are for zero-order diffraction on the holographic lens; the third term is the "twin" image.

The last, fourth, term $(|U_2|)^2 \cdot U_2$, zero-order diffraction, creates a blurred projection of the target, convolved with the elementary "building block" of the mask and convolved with the propagation function (diffraction from the mask to the FPA). This blurred image of the scene will be located on the hologram. The hologram during reconstruction will act as a collimating lens; the blurred image of the scene from this fourth term of (5) will act as a background illumination.

Alternative Reconstruction

Figure 5:
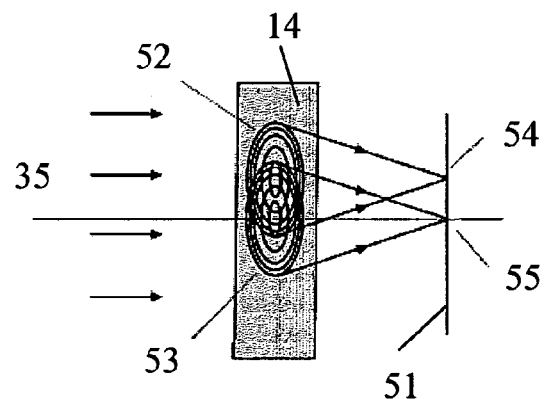
FIG. 5 is a schematic illustration of an alternative holographic reconstruction.

An alternative reconstruction is with a plane wavefront, and is shown in FIG. 5. The different "holographic lenses" produced by the wavefront of different tilts, arriving from different points of the scene, are shifted from the center of the FPA by different amounts. One plane reconstructing wavefront 35, parallel to the FPA 14 (normal to the axis) will be focused by the different holographic lenses into different points in the focal, or image, plane 51, as illustrated by the different points 54 and 55. The drawback, compared to the preferred reconstruction with the spherical wave discussed in connection with FIG. 4, is that off-axis lenses, produced by interference with a tilted wavefront during recording, are not only shifted 52 relative to the unshifted, on-axis lenses 53, but also differ in shape from circular. As a result, the real images 54 of the off-axis points will be aberrated—progressively so as their deviation off-axis increases. The real image 55 of an on-axis point is also illustrated.

A remedy is to use plane wavefronts of different tilts for reconstruction. In a range of angles close to the recording angle, aberrations will be small. Several reconstructions may cover the whole scene, to produce the image of the scene with low overall aberrations. Still, this approach is less attractive compared to the preferred one-step reconstruction with the spherical wavefront illustrated by FIG. 4.

Finite Size Aperture

The preceding discussion was of the wavefront capture and reconstruction with the mask at recording being a small obscuration ("dust particle"), and at reconstruction the complementary mask being a small pinhole. In this approximation, the hologram is the interference pattern of two wavefronts: spherical, scattered on the dust particle, and the undisturbed plane wavefront.

If the obscuration has a finite size, as now illustrated by FIG. 6, the above considerations would need to be detailed as follows. At recording, the hologram is the result of interference between a wavefront diffracted on the obscuration and the plane wavefront disturbed by the obscuration that shadows it in part. At reconstruction, the reconstructing wavefront is produced by illuminating an opening in a large opaque screen, the size and shape of the opening identical to those of the obscuration used in recording. Therefore, the mask forming the reconstructing wavefront is still complementary to the mask used for recording. Accordingly, expressions (1)-(3) still apply.

The result of the reconstruction is the same wavefront as the plane wavefront at recording: a nearly plane wavefront, disturbed by the presence of obscuration in the optical path before the hologram, where the obscuration introduced by 21 was during the recording.

The "disturbance" of the reconstructed wavefront will not affect the imaging significantly. For each point of a distant scene or target, a large wavefront will be reconstructed, over aperture sizes likely in the centimeters or tens of centimeters range. The "disturbance" will be from an obscuration (a "virtual image" of the obscuration) the size of the coded-aperture pixel ("building block"), likely, tens to hundreds of microns. To produce the image of the scene, the collimated wavefront is (digitally) focused by a perfect lens into its focal plane. The effect of the wavefront disturbance is similar to that of a small obscuration at or before the pupil of a large lens—a negligible effect.

Explanation of Simplifications in Foregoing Discussion

Figure 12:
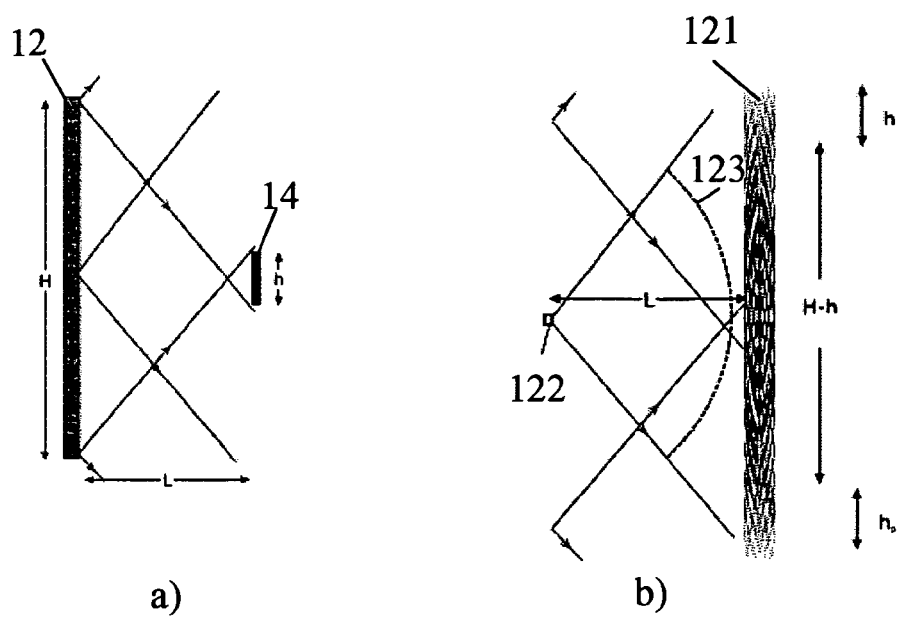
FIG. 12 is a plan view of a) the physical layout of coded aperture mask and FPA; b) effective holographic reconstruction after correlation.

FIGS. 2 and 3, as well as FIGS. 4a and 4b, as well as FIGS. 6a and 6b, are simplified in two ways for purposes of illustration, in relation to the actual preferred practice of the invention. First, FIGS. 2, 4a and 6a illustrate a coded-aperture mask 21 which is a "dust particle" or "obscuration," while FIGS. 3, 4b, and 6b illustrate a "complementary" mask 31 which is the "negative" of the foregoing, i.e., an opaque surface with a "pinhole." In actual practice, as will be elaborated further below, coded-aperture mask 21 comprises an array of obscurations and apertures with a single autocorrelation peak, such as but not limited to a random array or a uniformly redundant array (URA) or a modified uniformly redundant array (MURA). The complementary array is still the negative of this. In practice, both the array and the complementary array preferably each contain obscurations over approximately 50% of their surface, and apertures over the remaining approximately 50% of their surface, with each array/mask being the negative of the other, and wherein either array/mask can be used as the "original array/mask," with the "complementary array/mask" then being defined as the "negative" of the original array/mask. Thus, both the original masks labeled 21 and the complementary masks labeled 31 in the drawings are both instances of the coded-aperture mask 12 as illustrated in FIG. 1, and also, FIG. 12a. The question of what version of 12 is defined and used to be the array/mask 21 and what is therefore selected to be the complement/negative array/mask 31, becomes an arbitrary choice, but in effect, element 12 of FIG. 1 this some sense become "replicated" twice, once for the "original mask" 21 and once for the "complementary mask" 31 (and more generally, for the "second" mask which is a "function of" the original mask and preferable its complement).

Figure 6:
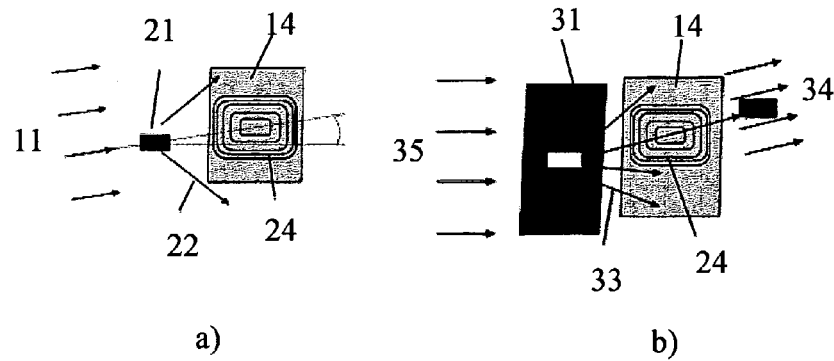
FIG. 6 is a schematic illustration of holography with a finite size obscuration and complementary aperture: a) recording; b) reconstruction.

Second, while element 12 in FIG. 1 is in this sense "replicated" twice, once for the "mask" 21 and once for the "complementary mask" 31, the replication does not extend to the issue of the incoming wavefront, which is represented as 11 in FIGS. 1, 2, 4a and 6a and 35 in FIGS. 3, 4b and 6. This gets to the distinction between recording of a scene which is illustrated by FIGS. 2, 4a and 6a, and the "reconstruction" (or, loosely, playback) of the scene which is illustrated by FIGS. 3, 4b and 6b. In FIGS. 2, 4a and 6a, the incoming wavefront 11 represents real, physical luminous radiation which does originate from the target scene being recorded, and is passed through the (original, non-complementary) mask 21. For reconstruction, however, the wavefront, now labeled as 35, does not necessarily originate from the scene but is an independent light source used for reconstruction, and in fact, this reconstruction wavefront 35 may, but does not have to be, real, physical luminous radiation and, in the preferred embodiments, is in fact virtual, digitally-represented radiation. That is, in the preferred embodiment, FIGS. 2, 4a and 6 are present real, physical processes, and FIGS. 3, 4b and 6b represent, in at least some embodiments, digital, virtual processes.

Finally, recognizing that the recording and reconstruction of the original recorded target scene essentially involves using an original mask and its complement, and separating various features of the image using equations (1) through (6) above to arrive at a faithful reconstruction of the original scene, the reader may note, if the real, physical wavefront of the scene itself is passed through the mask as in FIGS. 2, 4a and 6 onto the (original) focal plane 14 but a different (real or virtual) wavefront is passed through the complementary mask as in FIGS. 3, 4b and 6b onto another (complementary) focal plane, that some information from the scene could be lost. This is because equation (1) assumes that $U_1$ is the wavefront from the scene, which it is, and that that $U_2$ is also the wavefront from the scene, which, in at least some embodiments, it is not. Rather, $U_2$, in some of the embodiments, is an independent, real or virtual, reconstructive wavefront. It should be noted that in these embodiments, there is in fact some information loss which occurs because $U_2$ is not a wavefront from the scene. However, the only information lost in these embodiments is certain phase information which does not affect the ability to achieve a precise reconstruction of the original image. In the event an application of this invention does require this missing phase information, there are further techniques which can be applied to restore this information as well, although these techniques are beyond the scope of the present disclosure.

Coded Aperture Array

The above consideration was of a mask produced by a single obscuration and the complementary mask—single aperture. The same consideration, including expressions (1)-(3), is valid for any array of apertures, complementary to an array of obscurations. The two-dimensional array needs to have a single autocorrelation peak. This condition is satisfied, for example, by a random array. Another satisfactory example is a uniformly redundant array (URA) or a modified uniformly redundant array (MURA).

Each of the "dust particles" or obscurations of the array, illuminated by a wavefront from a point of the target, will produce a "holographic lens" as was already discussed. Each "holographic lens" is a result of recording a hologram of the light diffracted on the "dust particle" interfering with the wavefront un-diffracted on the particle, i.e., near-circular fringes forming the holographic lens. Reconstruction of the hologram is done with the "complementary mask" with a pinhole in place of each "dust particle" (opaque point of the original mask). The spherical wavefront from each pinhole is collimated by the respective holographic lens to reproduce the same wavefront as the undisturbed wavefront at recording, for any tilt of the wavefront.

Many "dust particles" placed at random to forming URA, act similarly to one particle/pinhole. For any wavefront, un-diffracted light will interfere with the light scattered on the given particle as if there were no other particles. As for the interference between the light scattered by the given particle and the other particles, the phase will be random, canceling out the contribution of this interference during correlation with the mask, as is now discussed in the following:

The diffraction pattern captured by the FPA is correlated with the complementary mask (pinholes) of the coded array. As a result, the many "holographic lenses" captured by the FPA form one "holographic lens" in the output of the correlation processing in which cross-correlation of the FPA pattern and of the mask coded pattern is computed. The effect of interference of the many scattered spherical waves from each "dust particle" with each other will be negligible due to the statistical properties of the mask having a single autocorrelation peak. This makes it possible to reconstruct all wavefronts from all points of a scene or targets using one spherical reconstructing wavefront—provided the mask element is sufficiently small—so that diffraction on the mask results essentially in a spherical wavefront. The reconstruction with a single spherical wavefront is a convenience but not a requirement of this invention.

The mask element may be larger, and the diffracted wavefront may differ from spherical, as long as the diffraction angle is large for the diffracted light to cover a substantial part of the FPA. In this case, reconstruction should be done with the wavefront diffracted on a single mask element, not necessarily spherical. The result of the reconstruction will still be the sensed wavefront arriving from the scene at the mask and the diffraction-limited image of the scene.

Even if the mask element is too large to cause significant diffraction, the processing according to this invention will produce an image of the scene, with the resolution being limited by the FPA pixel size, as in the prior art, rather than being diffraction limited.

Unlike the inventions disclosed in the patents to Slinger, this invention uses what Slinger refers to as standard coded aperture mask. Unlike Slinger, who uses the aperture mask as the hologram to form a well-defined pattern (similar to a standard coded aperture mask) on the FPA, this invention forms a digital hologram on the FPA, produced by diffraction on a standard coded aperture mask. In other words, Slinger's "holographic mask" forms a "standard coded aperture" pattern on the focal plane array, whereas this invention uses a "standard coded aperture mask" to form a "digital hologram" on the focal plane array.

This invention then uses the digital hologram formed on the FPA, with many levels of gray and bit depth defined by the FPA, as the basis holographically reconstructing the original target scene image. As a result, the higher order diffraction at reconstruction is not an issue. Noise can be reduced with low-noise and high bit-depth sensors (FPA). Single-frame sensing allows for conventional, passive, low-cost masks and for imaging from moving and vibrating platforms.

All embodiments entail passing at least one scene wavefront from a target scene (11) through at least one original coded aperture mask (12, 21) onto a focal plane array 14, producing a diffracted projection 24 of the target scene; and processing the diffracted projection 24 into a representation of the target scene by correlating a function of the diffracted projection (often, but not always, the diffracted projections itself) with a function of a known array pattern of the at least one original coded aperture mask (preferably, but not limited to, the complement of the original mask) and by using at least one reconstructing wavefront 35 for holographic reconstructing.

Figure 7:
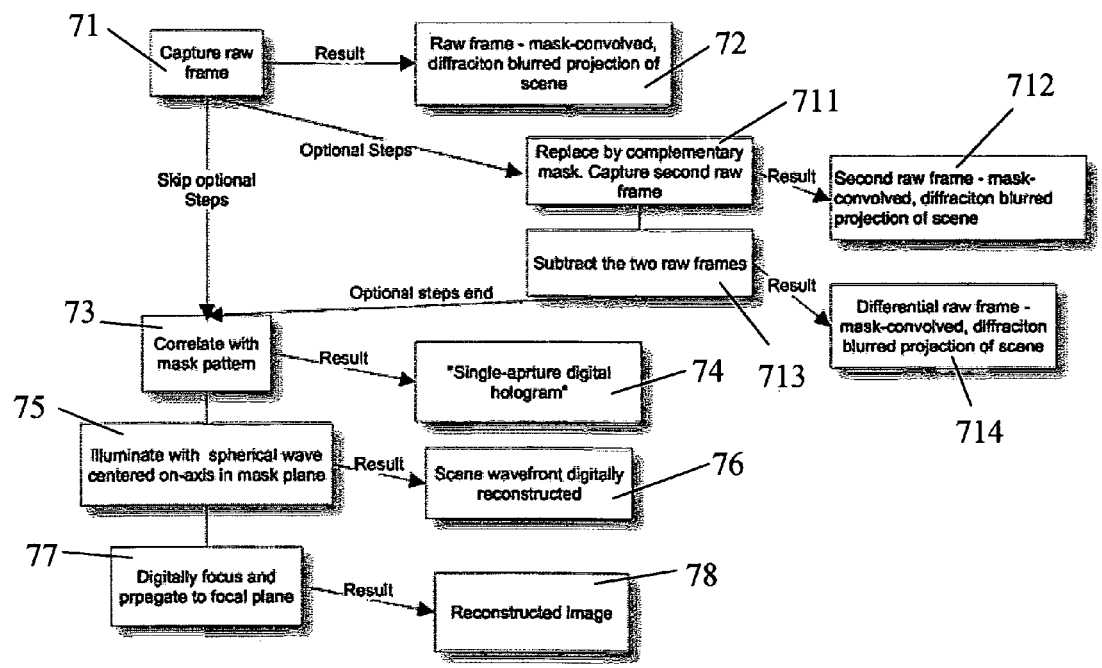
FIG. 7 is a flowchart of a preferred embodiment of the coded-aperture imaging process according to the invention.

In the following, a two-dimensional digital pattern of values −1 corresponding to opaque, and +1 corresponding to transparent areas of a mask, is referred to as a bipolar pattern. Referring to FIG. 7, the practical preferred embodiment method is as follows:

1. Place an FPA behind a coded-aperture mask with a coded pattern of apertures and obscurations—the mask preferably, but not limited to, a URA. The feature size on the mask is preferably small. The mask is illuminated by light arriving from the target and/or scene.
2. Capture the raw diffraction pattern on the FPA, 71, resulting in a mask-convolved, diffraction-blurred projection of the target scene 72.
3. Calculate cross-correlation of the FPA pattern with the complementary bipolar coded aperture mask pattern, 73. The result is a hologram with a single "holographic lens" for each point of the scene or target, 74.
4. Perform wavefront reconstruction: digitally (i.e. virtually) "illuminate", e.g., by digital Fresnel propagation, the hologram by a reconstructing wavefront. The reconstructing wavefront is the result of illuminating by a plane wavefront, propagating along the system optical axis, of an aperture of a certain shape and size, located on-axis in the same plane where the coded aperture mask was during the recording 75. The shape and size of the apertures are identical and complementary to those of the "building block" of the coded-aperture mask. The "building block" is the feature, e.g., a square of a finite size, or a small circle, etc., which is repeated in the coded aperture mask to form its pattern. If the "building block" has sufficiently small size, the reconstructing wavefront is a spherical wavefront, centered on-axis in the plane of the coded mask. The result of the reconstruction will be a (digitally reconstructed) phase wavefront for every point of the scene or target, 76.
5. From the reconstructed wavefront, the image of the scene is produced, by optional "digital focusing" and propagation to the image plane 77, where intensity at each point forms the image 78. That is, this optional step entails focusing the holographic reconstruction onto an image plane, producing an image of the target scene.

In this embodiment, the correlating occurs before the holographic reconstructing; the correlating produces a hologram of the target scene; and the holographic reconstructing comprises Fresnel illuminating the hologram into a holographic reconstruction of the target scene.

Two options for improving the reconstruction by implementing the correlation (step 3) in situations where the wavefront from a point of the target scene incident on the coded-aperture mask has aberrations or is otherwise substantially different from a plane wave over an area comparable to the area of the FPA are as follows:

3, A) (alternative A to step 3) Calculate cross-correlation of a function of the diffracted projection on the FPA, defined as a portion of the FPA pattern, with the complementary bipolar coded aperture mask pattern, 73. The result is a hologram with a single "holographic lens" for each point of the scene or target, 74.

3, B) (alternative B to step 3) Calculate cross-correlation of the FPA pattern with a function of the complementary bipolar coded aperture mask pattern, 73, namely, a morphed pattern of the complementary bipolar coded aperture mask pattern. The result is a hologram with a single "holographic lens" for each point of the scene or target, 74. For example, if a lens is present in the optical path, the lens transforming a plane wave from a point of the scene into a spherical wave, the above-mentioned morphing of the mask pattern is magnification, or change of scale.

The foregoing functions of the diffracted projection and of the original coded aperture mask are applicable in other embodiments as well.

An option for implementing reconstruction (step 4) is to perform physical reconstruction instead of one which is digital, i.e., virtual. For the physical reconstruction, the hologram pattern is displayed on a spatial light modulator and illuminated by (preferably) a laser beam.

An optional processing step, to follow preferably after the FPA capture, is to subtract another FPA pattern, captured with the same scene and a complementary coded-aperture mask:

2a) Capture the diffraction pattern on the FPA with the coded-aperture mask replaced by the complementary mask pattern, at 711, yielding a second, complementary diffracted projection of the target scene 712.

2b) Subtract the two captured FPA patterns 713 to arrive at a diffracted projection comprising a difference between the diffracted projection, and the complementary diffracted projection, 714. Use the difference in the subsequent steps.

That is, at least one scene wavefront is passed from a target scene through a complement of the at least one original coded aperture mask, producing a complementary diffracted projection of the target scene; wherein: the function of the diffracted projection comprises a difference between the diffracted projection, and the complementary diffracted projection.

This optional processing eliminates the last term in equation (5), $(|U_2|)^2 \cdot U_2$, zero-order diffraction. Unlike the first term in equation (5), which is uniform illumination of the FPA by the distant scene, this last term is the pattern of diffraction on the complementary mask. Depending on the mask feature size, this term may change relatively fast over the hologram, affecting reconstruction. The optional subtraction step eliminates this effect. The associated cost is the need to co-register two captured frames and a doubled required bandwidth of the video channel. The processing overhead increases insignificantly, limited to frame subtraction.

The above discussion was for a single point of a distant target scene and the respective single plane arriving wavefront. The same is true for a target scene point (object, target) at a closer distance, with the only change being from plane wavefront to spherical wavefront centered on the point of the target scene (which may be an object).

The above discussion can also be directly applied to any number of points in the target scene, including continuous intensity distributions and arbitrary wavefront shapes. As is discussed in the section Spatial Coherence, under natural illumination, resolved points of the scene are typically spatially incoherent. For this reason, the "holographic lenses" produced in the FPA by the light from each resolved point (element) of the scene will be intensity-additive, with no coherent effect (no interference). All "holographic lenses" are recorded with the maximum intensity in the center, so there is no "phase shift" between intensity patterns and the resulting holographic lenses. The reason for this is that at recording, the central point of the "lens" has no phase shift relative to the reference, un-diffracted, plane wavefront.

Figure 8:
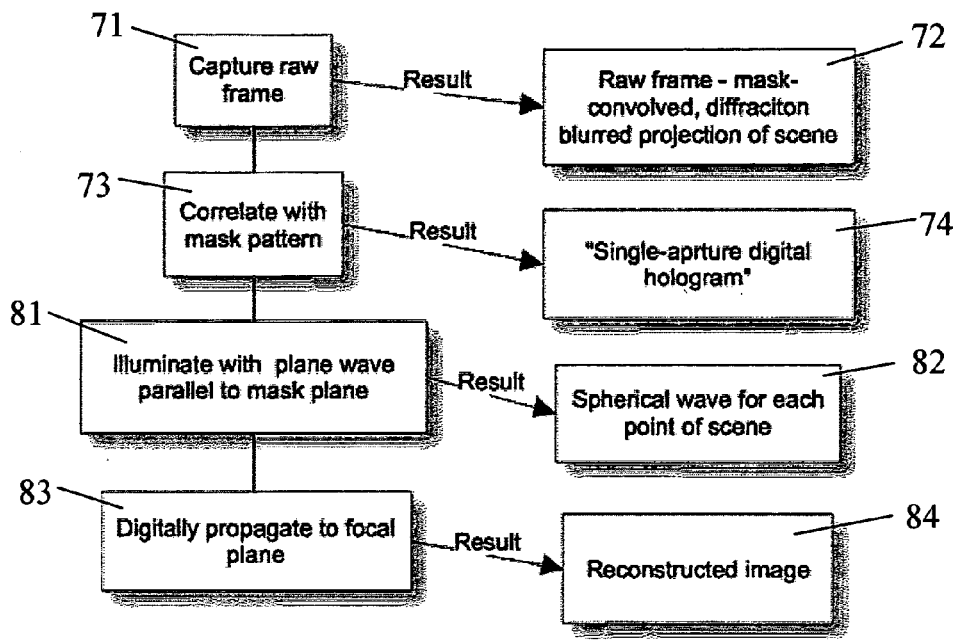
FIG. 8 is a flowchart of a first alternative embodiment for the coded-aperture imaging process.

A first alternative embodiment, summarized in FIG. 8, is as follows:

1. Place an FPA behind a coded-aperture mask with a coded pattern of apertures and obscurations—preferably, but not limited to, a URA. The feature size on the mask is preferably small. The mask is illuminated by light arriving from the target scene.
2. Capture the raw diffraction pattern on the FPA, 71, resulting in a mask-convolved, diffraction-blurred projection of the target scene 72.
3. Calculate cross-correlation of the FPA pattern with the complementary bipolar coded aperture mask pattern, 73. The result is a hologram with a single "holographic lens" for each point of the scene or target, 74. (the foregoing are identical to the first three steps in FIG. 7.)
4. Perform wavefront reconstruction: digitally (i.e. virtually) "illuminate", e.g., by a plane wavefront parallel to the mask, 81. The result will be a set of (digitally reconstructed) spherical wavefronts, 82, for each point of the scene.
5. Propagate (digitally, i.e., virtually) to focal plane 83; calculate intensity at each point of the focal plane. The result is the reconstructed image of the scene, 84.

To summarize, in this embodiment, correlating occurs before holographic reconstructing; the correlating produces a hologram of the target scene; and the holographic reconstructing comprises illuminating the hologram into a holographic reconstruction of the target scene; further comprising: propagating the holographic reconstruction onto an image plane and calculating intensity at points of the image plane, producing an image of the target scene.

Figure 9:
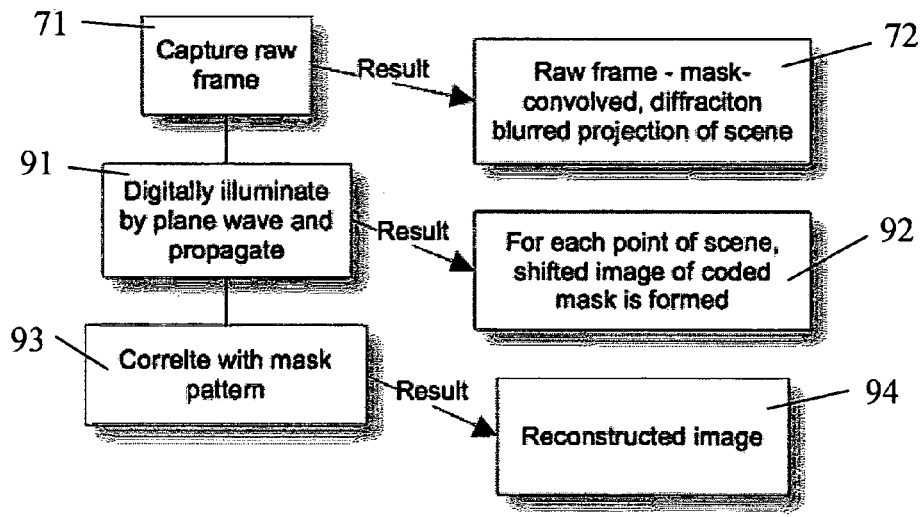
FIG. 9 is a flowchart of a second alternative embodiment for the coded-aperture imaging process.

A second alternative embodiment, summarized in FIG. 9, is as follows:

1. Place an FPA behind a coded-aperture mask with a coded pattern of apertures and obscurations—preferably, but not limited to, URA. The feature size on the mask is preferably small. The mask is illuminated by light arriving from the target and/or scene.
2. Capture the raw diffraction pattern on the FPA, 71, resulting in a mask-convolved, diffraction-blurred projection of the target scene 72. (All as in FIGS. 7 and 8.)
3. (Digitally) illuminate the raw FPA pattern by a plane wave and propagate by the mask-to-FPA distance 91. The result will be a set of overlapping images of the mask pattern, each shifted by a unique shift amount and direction for each point of the scene, 92.
4. Calculate cross-correlation of the result with the complementary, preferably bipolar, coded-aperture pattern, 93. The result will be the reconstructed image of the scene 94.

In this embodiment, holographic reconstructing occurs before correlating; the holographic reconstructing comprises illuminating the diffracted projection of the target scene as a hologram of the diffracted projection to produce a pattern image; and the correlating comprises correlating the pattern image of the hologram with the function of the known array pattern of the at least one original coded aperture mask, producing an image of the target scene.

Figure 10:
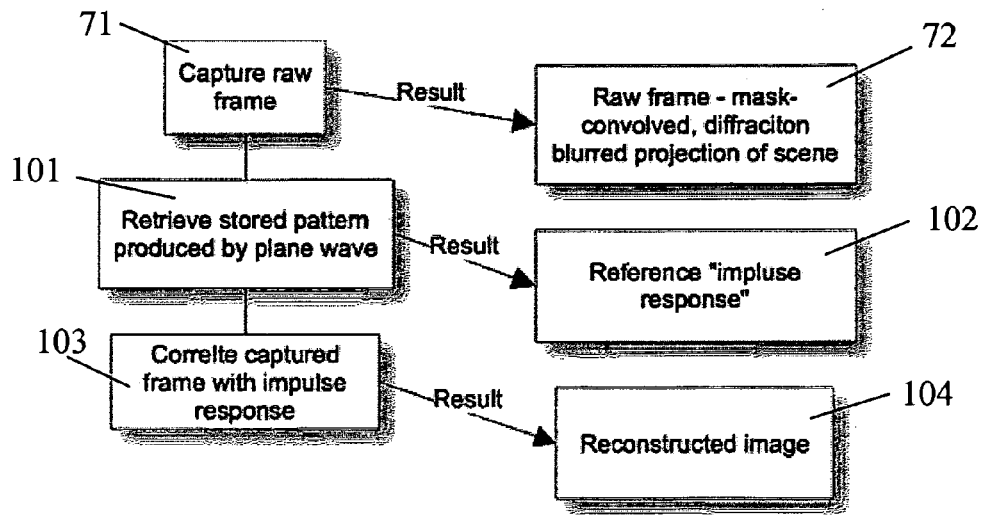
FIG. 10 is a flowchart of a third alternative embodiment for the coded-aperture imaging process.

A third alternative embodiment, summarized in FIG. 10, is as follows:
1. Place an FPA behind a coded-aperture mask with a coded pattern of apertures and obscurations—preferably, but not limited to, URA. The feature size on the mask is preferably small. The mask is illuminated by light arriving from the target and/or scene.
2. Capture the raw diffraction pattern on the FPA, 71, resulting in a mask-convolved, diffraction-blurred projection of the target scene 72. (All as in FIGS. 7 through 9.)
3. Retrieve from memory a previously stored "impulse response," which is the pre-calculated FPA pattern produced by illumination of the coded mask, preferably bipolar, with a plane wavefront parallel to the mask plane, 101 and 102.
4. Calculate the cross-correlation of the FPA pattern with the "impulse response," 103. The result will be the reconstructed image of the scene, 104.

This embodiment comprises the function of the diffracted projection comprising the diffracted projection; the function of the known array pattern of the at least one original coded aperture mask comprising a prerecorded impulse response comprising a complex field produced by passing a wavefront through the at least one original coded aperture mask onto the focal plane array; and correlating the diffracted projection with the impulse response to produce an image of the target scene.

The "impulse response" retrieved in the second step of the flowchart of FIG. 10 is the calculated complex field on the FPA, rather than intensity pattern on the FPA, with the coded-aperture mask illuminated by a single plane wave (point source, "single star," or "impulse"). A PCT publication WO 2007/091045 by Payne uses the intensity pattern on the detector array to determine the decoding pattern corresponding to the coded aperture array. According to Payne, the reference object may be a point source in which case the pattern on the detector array may be used directly as the decoding pattern or it may be used to correct a theoretical pattern for any misalignment. Unlike Payne, this invention uses correlation of the reference complex field with the intensity pattern of the sensor, resulting in improved signal-to-noise ratio.

Figure 11:
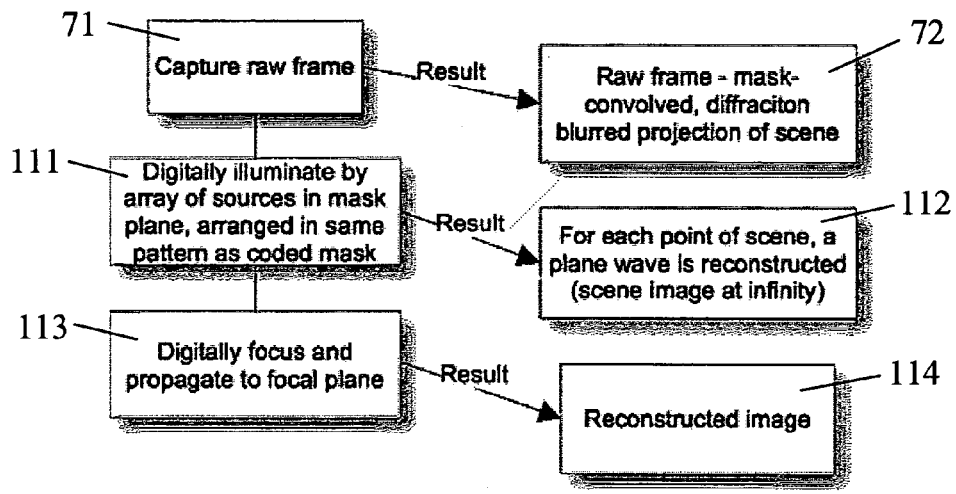
FIG. 11 is a flowchart of a fourth alternative embodiment for the coded-aperture imaging process.

A fourth alternative embodiment, summarized in FIG. 11, is as follows:
1. Place an FPA behind a coded-aperture mask with a coded pattern of apertures and obscurations—preferably, but not limited to, URA. The feature size on the mask is preferably small. The mask is illuminated by light arriving from the target and/or scene.
2. Capture the raw diffraction pattern on the FPA, 71, resulting in a mask-convolved, diffraction-blurred projection of the target scene 72. (All as in FIGS. 7 through 10.)
3. Digitally (virtually) illuminate the resulting pattern as a digital hologram by an array of light sources placed in the plane of the mask, arranged in the same pattern as the transparent areas of the complementary mask, 111. The result will be a reconstructed set of plane wavefronts, one for each point of the scene, for each source of the array, the plane wavefronts related to the same point of the scene being parallel to each other, 112.
4. Digitally focus and propagate to a focal plane all plane wavefronts, and add resulting intensities of focal spots, 113. The result will be the reconstructed image of the scene, 114.

In this embodiment, correlating occurs before holographic reconstructing; the correlating produces a hologram of the target scene; and the holographic reconstructing comprises illuminating the hologram using an array of light sources arranged in a pattern complementary to the at least one original coded aperture mask, producing a holographic reconstruction of the target scene; further comprising: focusing the holographic reconstruction onto an image plane, to produce an image of the target scene.

Four additional alternative processes are provided by modification of the preferred process and the first through the third alternative process disclosed above in FIGS. 7 through 10, with the above descriptions modified to replace "calculate cross-correlation" by "correlate deconvolution." That is, the correlating comprising correlating using deconvolution. Any deconvolution method known in the art can be used, including matrix deconvolution or Fourier deconvolution. Noise suppressions such as in Wiener deconvolution may be used.

Effective Digital Hologram

The operation of this invention may be further explained as follows. Consider exposure of the focal plane array (FPA) 14 by a wavefront from a scene and diffracted on the coded aperture mask 12, see FIG. 12a. After correlation with the complementary mask pattern, the result of the correlation is identical to an intensity pattern that would be recorded on a large hologram ("correlation hologram" 121) by the interference of an object wavefront identical to the wavefront from the scene and a reference wavefront from an effective reference source 122, see FIG. 12b. The effective source is a small aperture—a single element (pixel, or "building block") of the coded-aperture mask 12, illuminated by the wavefront from the scene. If the size of this element is sufficiently small, the reference wavefront 123 is simply a spherical. The distance L from the source 122 to the hologram 121 is the same as the distance from the physical coded aperture mask 12 to the FPA 14. The size H of the hologram is comparable to the larger of the two: the coded-aperture mask 12 and the FPA 14. For the case where the coded aperture mask 12 is larger than the FPA 14, the size of the hologram 121 is comparable to the size of the mask 12, as is illustrated in FIG. 12b when contrasted for size with FIG. 12a. More specifically, the hologram is effectively apodized, having full, maximum contrast in the center which is substantially constant over the size of (H-h), where H is the size of the coded aperture mask 12, and h is the size of the FPA 14. Farther away from the center, the contrast of the hologram is lost and reduces to zero over the length of h, on each side of the H-h high-contrast region of the hologram. This apodization is a direct effect of the correlation process.

This interpretation of the coded-aperture imaging according to this invention is useful for understanding the imaging process and for determining, among other imaging characteristics, the field of view and resolution.

The foregoing process of imaging can be considered as entailing two main steps: 1) physical frame capture by the FPA through correlation, equivalent to recording the large, apodized hologram with the object wavefront arriving from the scene, mixed with the reference wavefront, i.e., diffraction on a single element of the coded aperture mask; and 2) reconstruction of the captured hologram using a similar reference wavefront.

Complementary Mask Implementations

While it is not necessary to subtract an FPA image captured with a complementary coded aperture mask, this optional step may be beneficial in some cases, removing the effect of zero-order diffraction on a single element of the coded aperture mask that acts as background in the imaging according to this invention. If the optional subtraction of the complementary pattern is desired, it may be implemented as follows. In the following, several implementations for capturing diffraction patterns from original and complementary coded-aperture masks are disclosed. It is understood that possible implementations of capturing such diffraction patterns are not limited to the specific examples presented in the following, and other implementations that will become obvious to a person having ordinary skill in the art may similarly be used in this invention. These obvious variants include, but are not limited to, transmission-type masks, reflective masks, and phase masks.

Polarization Masks

Figure 23:
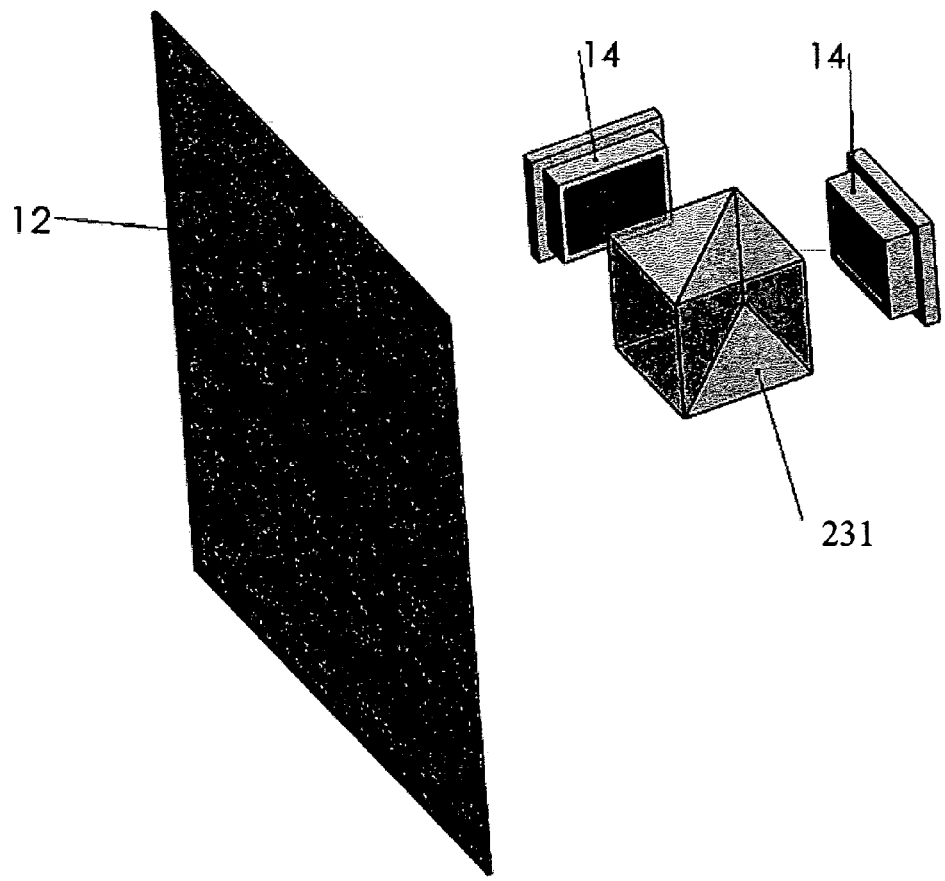
FIG. 23 illustrates the polarization-based separation of diffractions by original and complementary patterns of the mask using a polarizing beamsplitter.
Figure 24:
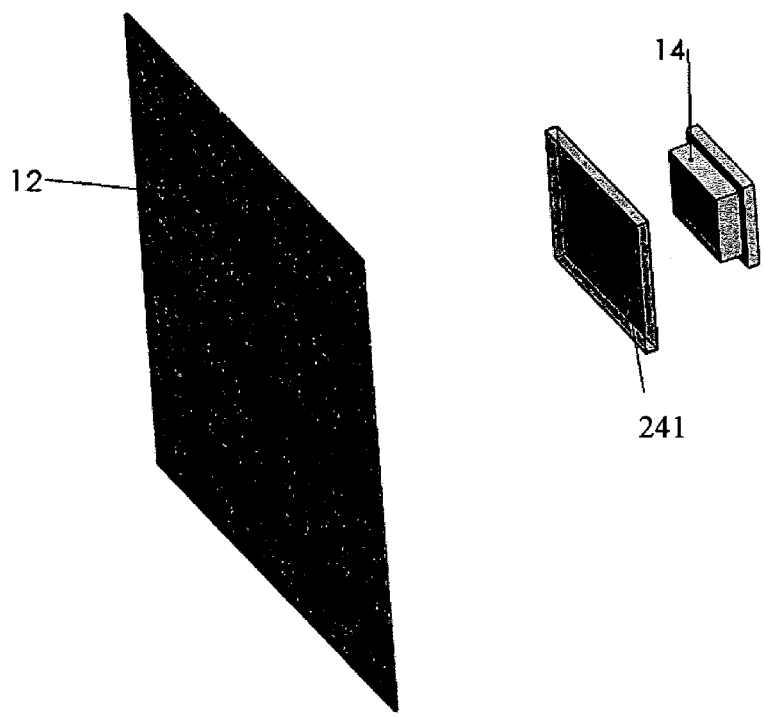
FIG. 24 illustrates the polarization-based separation of diffractions by original and complementary patterns of the mask using a (voltage controlled) polarization rotator.

As illustrated in FIGS. 23 and 24, a polarization coded-aperture mask 12 may be used, with two groups of polarizers. Within each group, polarizers are oriented in parallel; between the two groups, the polarizer orientations are at 90 degrees. The groups preferably cover equal total surface areas on the mask. For example, they may follow the pattern of a uniformly redundant array (URA), in which zero values would be represented by zero-angle polarizer orientation, and non-zero values by the group of polarizers at 90 degrees to the first group.

As in FIG. 23, the diffraction patterns produced by the polarization mask can be separated into the "original" and "complementary" using a number of methods obvious to a person skilled in the art. For example, the two optical patterns may be separated by a polarization beamsplitter 231 into two optical paths, each bringing light to one of two identical, co-registered FPA 14 Alternatively, as in FIG. 24, one optical path can be used, with a fast electronically controlled polarization rotator (PR) 241, such a ferroelectric liquid crystal (FLC) PR, combined with an analyzer behind the PR. Two consecutive frames may be captured by the same FPA 14, with the PR 241 immediately preceding the FPA 14 in the optical path, and the state of the PR 241 changing between the frames.

In sum, this implementation comprises a polarizing coded aperture mask comprising both original mask polarizers with a first polarization orientation and complementary mask polarizers with a second polarization orientation; wherein: diffracted projections produced by the original mask polarizers and diffracted projections produced by the complementary mask polarizers are respectively separated into the diffracted projection of the target scene and a complementary diffracted projection of the target scene.

Several other complementary mask implementations following on the basic concepts illustrated in FIGS. 23 and 24 are further reviewed below.

Diffraction Masks

The elements of the coded-aperture mask may be miniature diffraction gratings. The two states of the coded-aperture mask may be represented by two distinct directions of the gratings rulings, e.g., at 90 degrees to each other. At diffraction angles other than zero, the light from the two groups of gratings will be separated on the FPA, to be used in the processing of the holograms.

This implementation comprises a diffraction grating coded aperture mask comprising both original mask grating rulings and complementary mask grating; wherein: diffracted projections produced by the original mask grating rulings and diffracted projections produced by the complementary mask grating rulings are respectively separated into the diffracted projection of the target scene and a complementary diffracted projection of the target scene.

Refractive Masks

The two groups of the coded aperture mask elements may be refractive elements, such as prisms, to separate the two diffractive patterns by direction of propagation, similar to diffraction masks.

Here, we have a refractive coded aperture mask comprising both original mask refractive elements and complementary mask refractive elements; wherein: diffracted projections produced by the original mask refractive elements and diffracted projections produced by the complementary mask refractive elements are respectively separated into the diffracted projection of the target scene and a complementary diffracted projection of the target scene.

Reflective Masks

The two groups of elements of the coded-aperture mask may be transparent and reflective elements, e.g., produced by a patterned mirror on a transparent substrate.

In this implementation, one has a mixed transparent and reflective coded aperture mask comprising both transparent and reflective elements; wherein: diffracted projections produced by the transparent elements and diffracted projections produced by the reflective elements are separated into the diffracted projection of the target scene and a complementary diffracted projection of the target scene.

Dynamic Masks

Here, the coded-aperture mask is dynamic, e.g., implemented as a liquid-crystal display, or a MEMS device. The "normal" and the complementary masks are formed in sequence, and two FPA frames are captured, one with each mask. The two frames are subtracted in the processing.

This implementation employs a dynamic coded aperture mask for forming in sequence, both the at least one original coded aperture mask and the complement of the at least one original coded aperture mask; wherein: diffracted projections produced by the at least one original coded aperture mask and diffracted projections produced by the complement of the at least one original coded aperture mask are respectively separated into the diffracted projection of the target scene and a complementary diffracted projection of the target scene.

Performance Factors

Twin Images

Figure 13:
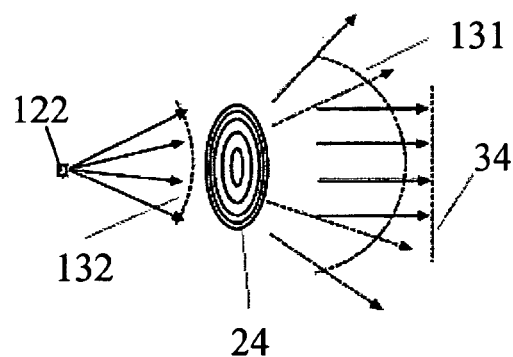
FIG. 13 is a schematic view of "Twin" reconstructed wavefronts.

Referring to FIG. 13, each "holographic lens" is in fact an on-axis hologram similar to a Gabor in-line Fresnel hologram. The second and third terms in (3) represent two "twin" images that are present after reconstruction by the spherical wave. One image is at infinity, formed by the reconstructed plane wavefront 34. The other image is a virtual image, formed by a diverging spherical wave. Physically, the two images are created by diffraction on the concentric near-circular rings of the hologram. The two images are the two diffractive orders (plus first and minus first) of the diffractive structure of the hologram. Higher orders are not present due to the smooth, sinusoidal profile of the hologram density (pixel values).

The twin spherical wavefront 131 forms a virtual image of the point—center of the reconstructing spherical wavefront 132—at half the distance between the reference point source 122 and the hologram 24. The radius of curvature of the twin wavefront is half the curvature of the reconstructing wavefront.

Either of the two images can be used in digital processing to arrive at the imagery of the scene. The unused twin image will create a defocused, wide-spread background, which can be removed by digital filtering.

Spatial Coherence

Under natural illumination, different resolved points of the scene are incoherent with each other. The reason for this, as is know from principles of physical optics, is that diffraction limited resolution is $$1.22 \cdot \frac{\lambda}{D},$$

whereas angular size of spatial coherence is $$0.16 \cdot \frac{\lambda}{D}.$$

As a result, diffraction patterns of different points of the scene add as intensities on the FPA (stacked holograms from each point of the scene, independent from each other). At reconstruction, each point produces an independent wavefront (plane wavefront if the point is at infinity, spherical if the point is close). Jointly, the overall wavefront from the scene is faithfully reconstructed.

Resolution

In diffraction-free coded-aperture imaging according to the prior art, resolution is defined by the angular size of the aperture element as viewed from the FPA. In the presence of diffraction, the practical resolution is considered in the prior art to be even worse, with the diffraction also limiting the minimal feasible aperture size.

In contrast to the limitations ordinarily understood to be inherent in using coded aperture imaging for larger wavelengths, the imaging resolution according to this invention is not directly defined by the feature size of the mask. Rather, the imaging resolution of this invention is similar to the resolution of a hologram. It is ultimately diffraction-limited by the effective size of the hologram and by the wavelength.

The hologram effective size is defined by four characteristic, or critical, sizes: The first is the size of the spot on the FPA from diffraction on the smallest feature ("building block") of the mask. This spot size is a product of the diffraction angle on the mask feature multiplied by the mask-to-FPA distance. The second critical size is that of the "holographic lens" limited by the pixel resolution of the FPA. The third critical size is that of the "holographic lens" limited by the coherence length (spectral width) of the light from the point of the scene or target. The hologram of this invention is a result of correlation of the diffraction pattern on the FPA with the pattern of the (complementary) coded-aperture mask. The fourth critical size is the size of this correlation. If the size of the "holographic lens," limited by the first three critical sizes, exceeds the size of the hologram (correlation output), the smaller size—the hologram in this case—will limit the imaging resolution. Limiting the imaging resolution will be the compound effect (convolution) of the four critical sizes. The resolution will be no better than defined by the smallest of the four sizes.

The size of the "holographic lens" is limited by pixel pitch of the FPA and by the coherence length of the source. It is a reasonable tradeoff to choose the spectral bandwidth for a given FPA pixel pitch so that the two sizes are close. Filtering to a narrower spectral band will cause light loss without the payoff of higher resolution. Wider spectral width will leave pixels on the FPA underused. For example, at the 4 um wavelength, distance from the mask to the FPA of 100 mm, pixel pitch 25 um, and on-axis target, the pixel-limited "holographic lens" diameter is 32 mm. The corresponding angular resolution is 3 milliradians. The "lens" diameter increases linearly with the mask-FPA distance L. The tradeoff spectral bandwidth is proportional to 1/L.

If the target has narrow-band spectral features of interest on a broad spectral background, the narrow-band features may produce larger "holographic lens" instances, and the related high spatial frequencies in the reconstructed image. In this case, broader filter bandwidth may be chosen, compared to the above tradeoff.

As long as the mask element is sufficiently small, and the diffraction by the mask produces a spot larger than the size of the "holographic lens" otherwise defined (by the FPA pixel pitch and by the coherence length), the coded aperture mask does not limit the resolution or field of view of the imaging. A smaller element size of the coded aperture mask also makes the reconstructing wavefront match a spherical wavefront more closely, which may simplify the digital hologram reconstruction.

When the "holographic lens" is small compared to the "correlation hologram", and a limited field of view is of interest, much of the coded-aperture mask may not contribute to the diffraction pattern that produces the portions of the hologram related to the field of view of interest. In this case, an adaptive coded aperture may be useful, which would close the unused apertures, to reduce background illumination of the FPA.

Field of View

In conventional digital holography, the resolution of the imaging sensor limits the field of view, for two reasons. First, once the angle between the object wavefront and the reference wavefront exceeds a certain threshold value, the size of the interference fringes falls below the pixel pitch of the FPA, and the hologram becomes undersampled. Second, at reconstruction, the periodic pixel structure of the FPA acts as a diffraction grating, producing higher diffraction orders. The higher orders produce repetitive, overlapping instances of the image. To avoid this, the field of view needs to be limited.

Unlike conventional digital holography, this invention provides for each point of the scene its own reference beam, so the digital reconstruction (or optical reconstruction, with SLM displaying the hologram, illuminated by a laser beam) is possible for all look angles. The tilt of the object wavefront (look angle) determines the center location of the "holographic lens" 24 on the FPA 14. The FPA pixel size affects the maximum diameter of the "holographic lens" 24 for look angle, related to diffraction-limited resolution of the reconstructed wavefront. For look angles within the angular size of the mask as viewed from the FPA 14, no limitation on the look angle and the field of view is posed in the imaging, according to this invention.

Provided sufficient coherence length (e.g., filtered light, or laser illumination), it is possible that the size of the "holographic lens" 24 exceeds the size of the FPA 14. At extreme look angles, the center of the "holographic lens" 24 may be outside the "correlation hologram" 121 with only the periphery of the "holographic lens" 24 inside "correlation hologram" 121. The condition when the frequency of the fringes reaches the Nyquist criterion dictated by the FPA pixel pitch defines the extreme look angle of the system. In principle, the extreme look angle and FOV may exceed the geometrical angle at which the mask 12 is viewed from the FPA 14, including the situation when the light from the scene arrives at the FPA as the "signal wave" outside the boundary of the coded-aperture mask.

Enhancement of Resolution and Field of View

In a conventional lens camera, resolution and field of view are usually mutually limiting: providing wider field of view reduces resolution, and vice versa.

In the imaging according to this invention, the field of view is defined by the angular size of the coded aperture mask 12 as viewed from the FPA 14. The resolution is defined by the effective size of the "correlation hologram" 121, the result of correlation of the capture FPA frame with the coded-aperture mask pattern, see FIG. 12. The hologram effective size (H-h) may exceed the size of the FPA 14 (h); in principle, it may reach and slightly exceed the size of the coded aperture mask 12. ("In principle," because the limitation exists related to the FPA pixel resolution, fringe spatial frequency, and hence the size of individual "holographic lenses" for each point of the scene.) This means that a larger coded-aperture mask 12 size H may simultaneously translate into a larger field of view and a higher resolution.

Figure 14:
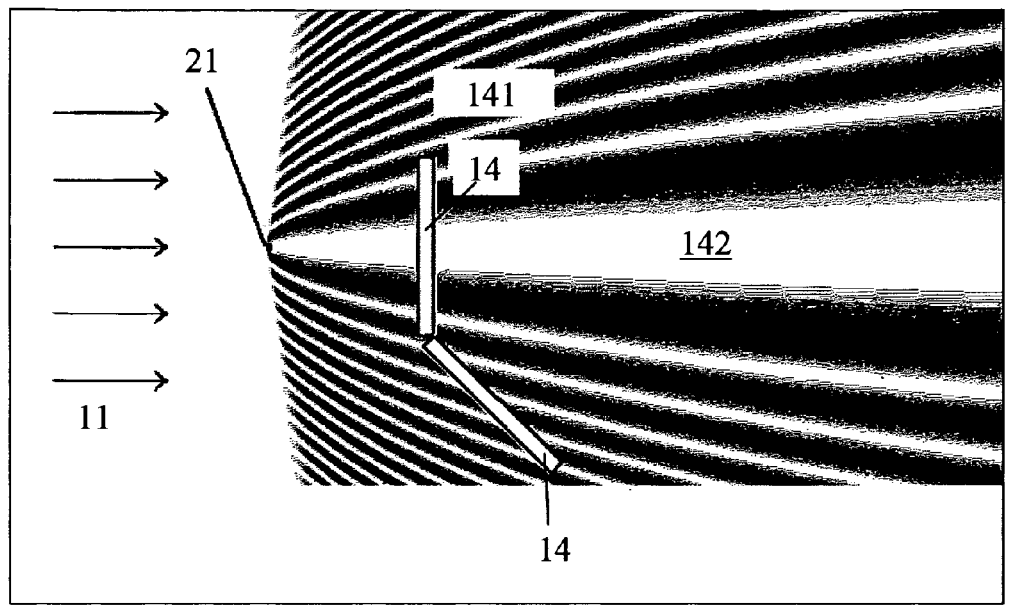
FIG. 14 is an image illustrating how the frequency of the fringes near the edge of FPA reaches the pixel spatial frequency. A second FPA is tilted so that fringes beyond the first FPA are still resolved.
Figure 15:
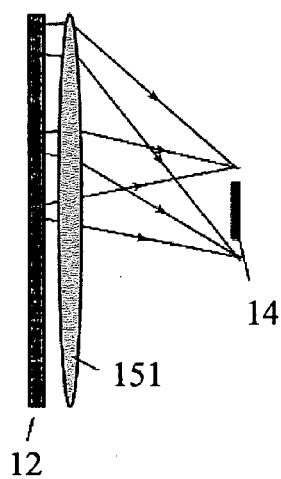
FIG. 15 is a plan view illustrating, for large coded-aperture masks, a lens may be used to direct more light to the FPA and the "holographic lens," enabling the use of larger masks. It is not the purpose of this lens to produce a focused image.
Figure 16:
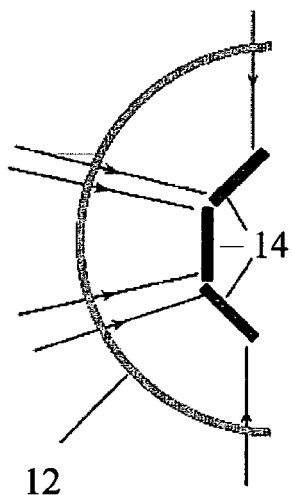
FIG. 16 is a plan view illustrating how a curved coded-aperture mask in combination with multiple FPAs or a curved FPAs offers extended field of view coverage, including conformal imaging.

FIGS. 14 through 16 illustrate envisioned approaches to enhancing resolution and field of view of the imaging system according to this invention.

FIG. 14 illustrates interference of a scattered spherical wavefront 142 with light from the scene 11, and how frequency of the fringes near the edge 141 of FPA 14 may reach the pixel spatial frequency. A second focal plane array 14 is tilted so that fringes beyond the former (untilted) FPA 14 are still resolved. This approach, wherein at least one original coded aperture mask and the focal plane array are substantially not parallel to one another, allows one to overcome the limitation on the useful size of the FPA limited by its pixel resolution.

FIG. 15 illustrates the use of an optical element (e.g., lens) 151 for concentrating the light energy on the FPA 14. For large coded-aperture masks 12, diffracted light from off-axis portions may miss the FPA and thus not contribute to producing the "holographic lens," which in most embodiments is the output of the correlation processing. In such cases, a lens 151 may be used as shown in FIG. 15 to bend the rays and to bring diffracted light to the FPA 14. The lens does not produce a focused image; its function is limited to directing/concentrating more of the diffracted light on the FPA 14 to reduce this wavefront loss.

It is to be understood that although most of the preceding discussion assumed a planar coded-aperture mask parallel to a planar FPA, coded aperture masks non-parallel to the FPA, and non-planar coded aperture masks and non-planar FPAs, as well as multiple FPAs, may be used in this invention. FIG. 16 illustrates how a curved, non-planar, coded-aperture mask 12 in combination with multiple FPA or with a curved FPA 14 offers extended field of view coverage.

Advanced Capabilities

Imaging in Non-Monochromatic Light

The effect of finite coherence length, defined by the spectral width of the imaged point of the scene, was already mentioned in relation to the size of the "holographic lens" 24 and imaging resolution. The broader the spectral bandwidth, the shorter is the coherence length, the smaller is the "holographic lens" diameter, and so the worse is the imaging resolution.

The above statement applies to smooth, "well-behaved" spectra. In some cases, the broad spectrum may contain fine spectral features, such as narrow peaks or troughs, e.g., from the target being "painted" by a laser beam, or having narrow emission or absorption spectral lines, such as in missile plumes. In these cases, the broad and smooth spectral components will result in smaller "holographic lenses," producing a target image at a lower spatial resolution; however, additive to these will be larger "holographic lenses" from the narrow spectral features, producing image features at higher spatial resolution.

Narrowing the imaging spectral range with bandpass or notch filters will increase spatial resolution as well. In this invention, higher spectral resolution results in higher spatial resolution—the two resolutions are not mutually competitive, unlike in some other imaging systems such as hyperspectral images where a limited number of pixels are shared between a number of "spectral planes." No such tradeoff is required in this invention.

Hyperspectral Imaging

The process of digital hologram reconstruction is dependent on the wavelength used in recording the hologram. Using a "wrong" wavelength value during reconstruction will result in a defocused image. If different wavelengths are present during recording in the arriving wavefront (as may be the case in many practical situations), when reconstruction is done using one specific wavelength, the one spectral component of the recording whose wavelength is used at reconstruction, will be in focus. At the same time, other spectral components of the image will be defocused. Multiple digital reconstructions at many wavelengths will result in many instances of the image, with different spectral components in focus. The multiple digital reconstructions may be combined with additional spatial filtering of the image, to arrive at a hyperspectral image of the scene (spectral cube).

Change Detection

During recording, each point of the distant scene arrives at the aperture or aperture array as a plane wave. It is registered on the FPA as a "holographic lens": a Fresnel hologram, with the reference spherical wave that has zero phase shift with the plane wave along the direction of propagation of the plane wave. At reconstruction, all of the "holographic lenses," each respective to a point of the target scene and an arriving plane wavefront, are illuminated by the same coherent spherical wavefront. As a result, the whole reconstructed complex wavefront (comprising all component plane wavefronts) is coherent, even though the original scene was spatially incoherent.

This makes it possible to process the image of the scene by means of coherent optics (or equivalent digital/virtual processing), as if the scene was displayed on a transparency and illuminated by a laser beam. A wealth of processing algorithms of coherent optics is therefore applicable to extracting information from the scene, including change in time (captured in a temporal series of frames by the FPA).

Figure 17:
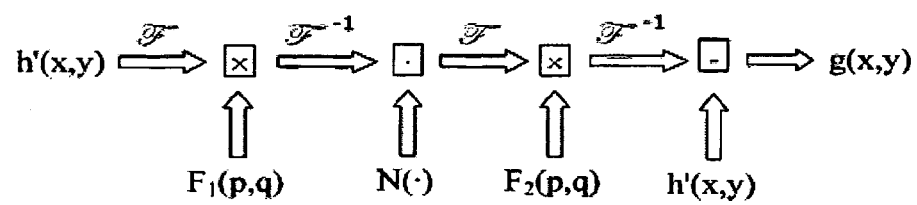
FIG. 17 is a schematic illustration of Fourier image processing for change detection.

One such processing algorithm is change detection. Many algorithms for change detection are described in the literature, and all may be suitably applied here within the capacities of persons of ordinary skill Referring to FIG. 17, a possible implementation of change detection according to the present invention is illustrated by way of example and not limitation in the following:

Consider image h(x,y) being a reference image of a scene; and image h'(x, y) is a shifted image of the same scene, containing a change g=h'−h, or, more expansively:

$$h'(x,y)=h(x-a,y-b)+g(x,y)$$

The change can be detected by using two Fourier-domain filters and a nonlinear filter.

The first Fourier filter is $$F_1(p, q) = \frac{1}{H(p, q) + 1}$$

where H(p,q) is the Fourier transform of the function h(x, y). The second filter is $F_2(p,q)=H(p,q)$ A nonlinear filter (converter), N(·), is applied to the image-plane intensity distribution, enhancing the image contrast. It may be implemented, for example not limitation, as $$N(t) = \begin{vmatrix} 2 \cdot \left(t - \frac{\max}{2}\right) \text{ if } t > \frac{\max}{2} \\ 0 \text{ otherwise} \end{vmatrix}$$

Thus, starting with h'(x,y) and applying $F_1(p,q)$ followed by N(·) followed by $F_2(p,q)$, and then subtracting off the shifted h'(x,y) yields g(x,y), which measures the difference h'−h.

Figure 18:
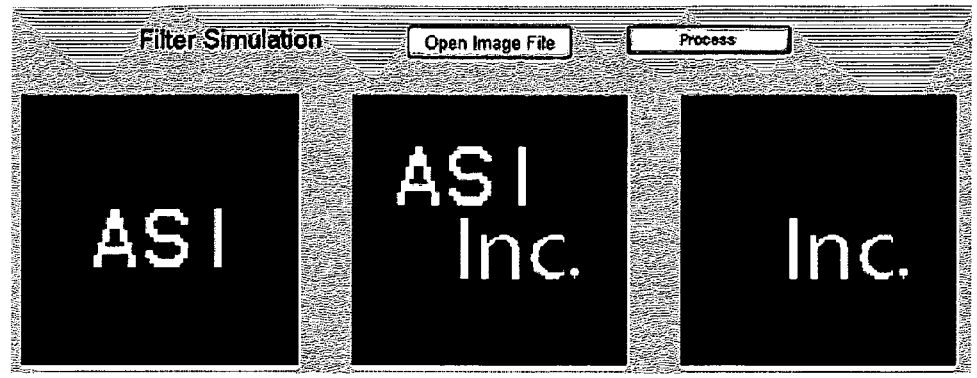
FIG. 18 is an image illustrating numeric simulation of change detection.

An experimental result of numeric simulation of this process is shown in FIG. 18, where the base image contains letters "ASI" and the changed image contains the same letters, shifted, and also letters "Inc." The processing result is the dimmed letters "ASI" and the bright letters "Inc.," indicating the change.

3D Imaging

If the object is at a finite distance (close enough for the incoming wavefront from the object being recorded to have a spherical aspect) from the "camera" (from the coded-aperture mask), the proposed imaging will capture the 3D structure of the object. Different views of the object from different viewpoints will be holographically captured and reconstructed.

Unlike conventional holography, no local reference beam is required; the reference wavefront for every point of the object is produced from the same wavefront, bearing certain similarity to the Smartt point-diffraction interferometer.

Additional capabilities of this invention for 3D imaging may be realized, as disclosed earlier, by placing the coded-aperture mask 12 and the FPA 14 at a non-zero angle, so that they are not parallel to each other, as illustrated by FIGS. 14 and 16.

Coherent Aperture Synthesis

With laser illumination, even at long, e.g., ~100 km ranges, the present invention may be used to capture the scene and target wavefront, including phase. Referring to FIG. 16, multiple imagers of this invention may produce complex, amplitude-and-phase images of the scene, which may be coherently combined to arrive at a higher imaging resolution, potentially diffraction-limited by the composite apertures of the multiple coded-aperture arrays. The aperture arrays may take shapes other than planar, including conformal aerodynamic shapes, or other conformal shapes. A possible embodiment may include multiple conformal coded-aperture arrays installed on the surface of the wing or body of a flying platform with one or multiple FPA installed inside the platform.

In other words, with coherent laser illumination, effective aperture can be large, synthesized from multiple individual coded-aperture arrays, with the resolution diffracted-limited by the composite synthesized aperture.

Polarimetric Imaging

Polarization-sensitive, or polarimetric, imaging is provided by this invention, with a coded-aperture mask comprising four sorts of surface areas (elements, or pixels, or "pinholes"): 1) opaque elements; 2) transparent elements of a first kind, covered with a polarizer material in a first orientation; 3) transparent elements of a second kind, covered with a polarizer material in a second orientation, perpendicular to the first orientation; and 4) transparent elements of a third kind, transparent to either polarization. The patterns formed by the transparent elements of the first, second, and third kinds are statistically independent, with zero or nearly zero cross-correlation.

Figure 25:
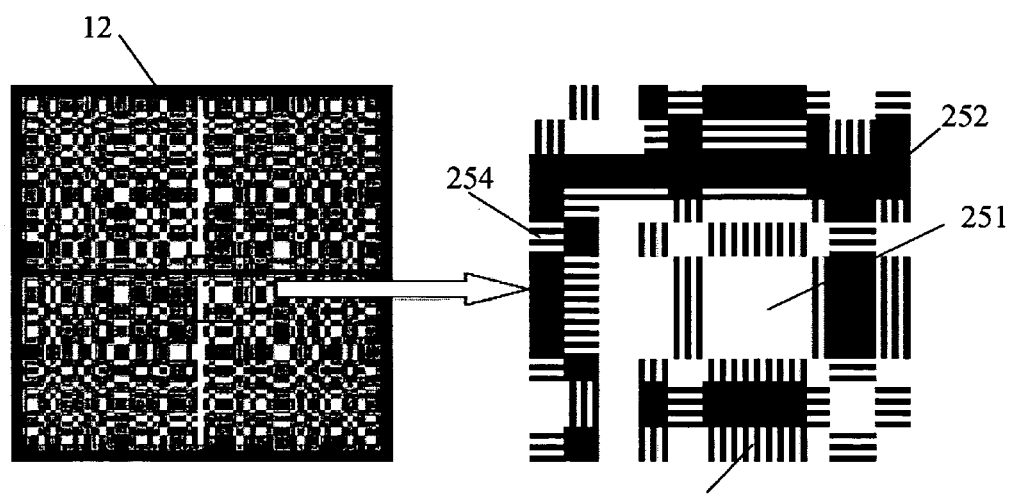
FIG. 25 depicts a polarization coded-aperture mask comprising four different types of surface areas.

This is illustrated in FIG. 25. The overall polarization coded-aperture mask 12 is shown on the left. A magnified fragment of the mask is shown on the right, with the four types of elements: transparent elements 251 as shown in white; opaque elements 252 shown in black; transparent elements of a first kind 253 indicated by vertical patterns, comprising (e.g., covered with) a polarizer material in the first orientation; and transparent elements of a second kind 254 indicated by horizontal patterns, comprising (e.g., covered with) a polarizer material in a second orientation, perpendicular to the first orientation.

The pattern formed on the FPA 14 by the light form the scene after passing through the mask is processed using any of the processing algorithms according to this invention. Processing with the mask pattern of the first kind results in a polarization image with the polarization component along the first orientation. Processing with the mask pattern of the second kind results in a polarization image with the polarization component along the second orientation, perpendicular to the first orientation. As a result, polarimetric imaging is provided, with orthogonal polarization components measured and presented in the respective pixel values of the two output images, for every point of the scene and/or target.

The diffracted projections from this mask are processed into a representation of the target scene in the first and second polarization orientations by correlating a function of the diffracted projection with a function of the pattern of the transparent elements, respectively, in the first and second polarization orientations, and for each polarization orientation, by using at least one reconstructing wavefront for holographic reconstructing Correction of Aberrations One or more optical elements or components (system optics) may precede the coded aperture mask in the optical path. Such an optical component may be, for example but with no limitation, a protective window or dome. This preceding component may introduce aberration in the optical wavefront arriving from the scene. The digitally reconstructed wavefront, produced by the processing algorithms according to various embodiments of this invention, includes both the phase of the un-aberrated wavefront form the scene and the phase aberrations of the preceding optics. The aberrations of the optics can be subtracted from the reconstructed phase. The corrected digital wavefront can then be "digitally focused" to produce an aberration-free image.

Alternatively, the digital pattern of the coded-aperture mask can be distorted (remapped) prior to use in the reconstruction algorithm of this invention. Proper distortion, or remapping, of the mask pattern will produce aberrations in the reconstructed wavefront that will compensate aberrations of the preceding optics.

If the aberrations of the preceding optics are known, e.g., from the optical prescription of the optics or from an independent measurement, the aberrations of the optics are subtracted from the reconstructed wavefront and image, to produce aberration-free wavefront and image. If the aberrations of the optics are unknown, they can be determined in a simple calibration procedure as follows: The coded-aperture imaging sensor with image processing according to this invention, assembled with the protective window or other optics, is illuminated by a calibration plane wavefront of very low aberrations. The phase of the digital wavefront reconstructed according to this invention is the aberration of the protective window or other optics. The measured optics aberration is stored in memory or in a computer storage device to be subtracted in future processing, to produce the aberration-free wavefront and image. The calibration procedure may be repeated for different orientations, or directions of incidence, of the calibration plane wavefront. Other shapes of the calibration wavefront, including but not limited to spherical, are equally applicable for this calibration.

Compensation of Atmospheric/Environmental Turbulence

Atmospheric, i.e., environmental turbulence introduces aberrations into a wavefront. If the aperture size exceeds the Fried parameter R0, which is the characteristic size of the aberration due to turbulence, image quality is degraded. Similar to correction of aberrations of protective windows or domes, the aberration due to the atmospheric/environmental turbulence can be removed from the digital wavefront reconstruction by processing according to this invention. Unlike the static aberration just discussed of the protective or other optics, aberrations from atmospheric turbulence are dynamic, changing from one captured FPA frame to another.

The atmospheric aberrations are determined and removed by maximizing a "sharpness function" of the resulting image, or other means known in the art, e.g., similar to the methods used in adaptive optics. Unlike adaptive optics, compensation of atmospheric/environmental turbulence according to this invention is performed digitally, i.e. virtually, i.e., computationally, either in real time or in post-processing. In referring to atmospheric and/or environmental turbulence, no limitation to the earth's atmosphere and/or environment is intended. Rather, recognizing that obstructions and distortions and aberrations can occur along the light wave propagation path in a wide variety of circumstances, this is intended to refer to the "atmosphere/environment" between the target scene and the coded aperture imaging system of this disclosure, from whatever source or origin, and for whatever reason.

Alternatively, the following method provides for correction of atmospheric/environmental turbulence: The reconstructed wavefront is subdivided, in the digital processing, into multiple coherent subapertures ("sub-wavefronts"), each smaller than Fried's parameter, R0. Each sub-wavefront is digitally focused to produce an image of the distant object. The resolution of each image is low, diffraction-limited by the size of the subaperture. Correlation of the multiple images is calculated, to determine the shift of image and the related tilt of the respective sub-wavefront, caused by the atmospheric turbulence. The established tilts are removed from each reconstructed sub-wavefront. All corrected sub-wavefronts are coherently added, to produce the corrected wavefront over the entire aperture of the telescope, with the effect of the turbulence removed. The corrected wavefront is digitally focused, to produce the high-resolution image, diffraction-limited by the overall telescope aperture.

The same method can be used to remove static wavefront aberrations, with the size of the subapertures smaller than the characteristic size of the aberration, i.e., the subaperture size over which variation of the phase aberrations is sufficiently small. The aberration is sufficiently small if the related phase ramp causes image displacement smaller than the diffraction-limited spot size, defined by the overall aperture (not the subaperture).

Figure 19:
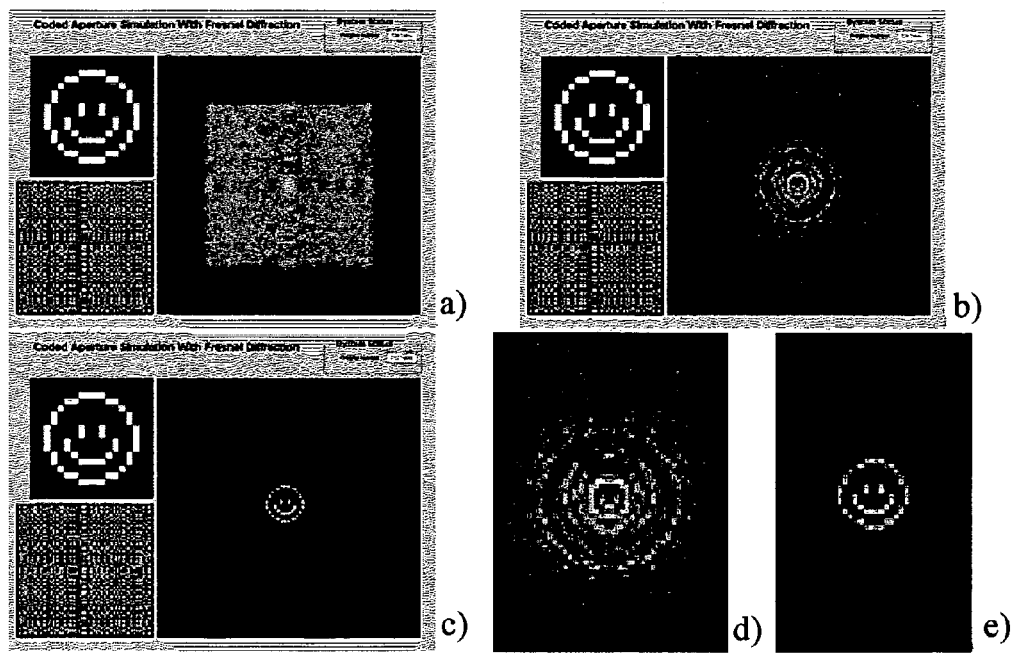
FIG. 19 contains a set of images illustrating numerical modeling of coded-aperture imaging according to various embodiments, specifically: a) graphical user interface (GUI) showing a model object, coded-aperture mask, and diffraction pattern on the FPA; b) the same, diffraction pattern correlated with the complementary mask pattern; c) a reconstructed image of the object; d) a fragment of correlation (b); and e) a fragment of reconstruction (c).
Figure 20:
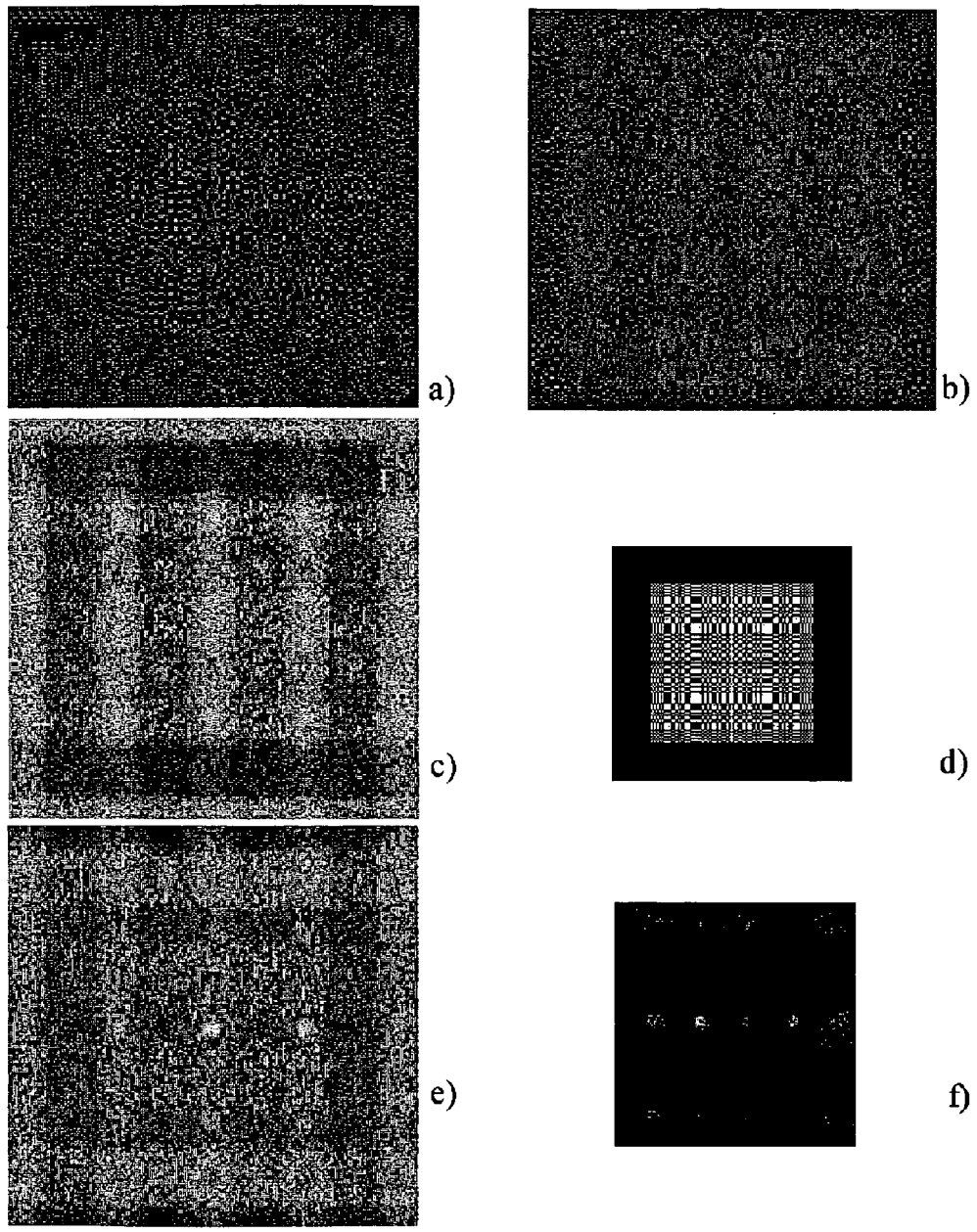
FIG. 20 contains a set of images illustrating diffractive coded-aperture imaging of transparency "A", specifically: a) a diffraction on the FPA from a "positive" coded-aperture mask; b) the same with complementary mask; c) the difference of the foregoing two diffraction patterns; d) the coded-aperture mask; e) the digital hologram—correlation of the differential diffraction pattern with the mask; and f) the output of digital reconstruction of the hologram.
Figure 21:
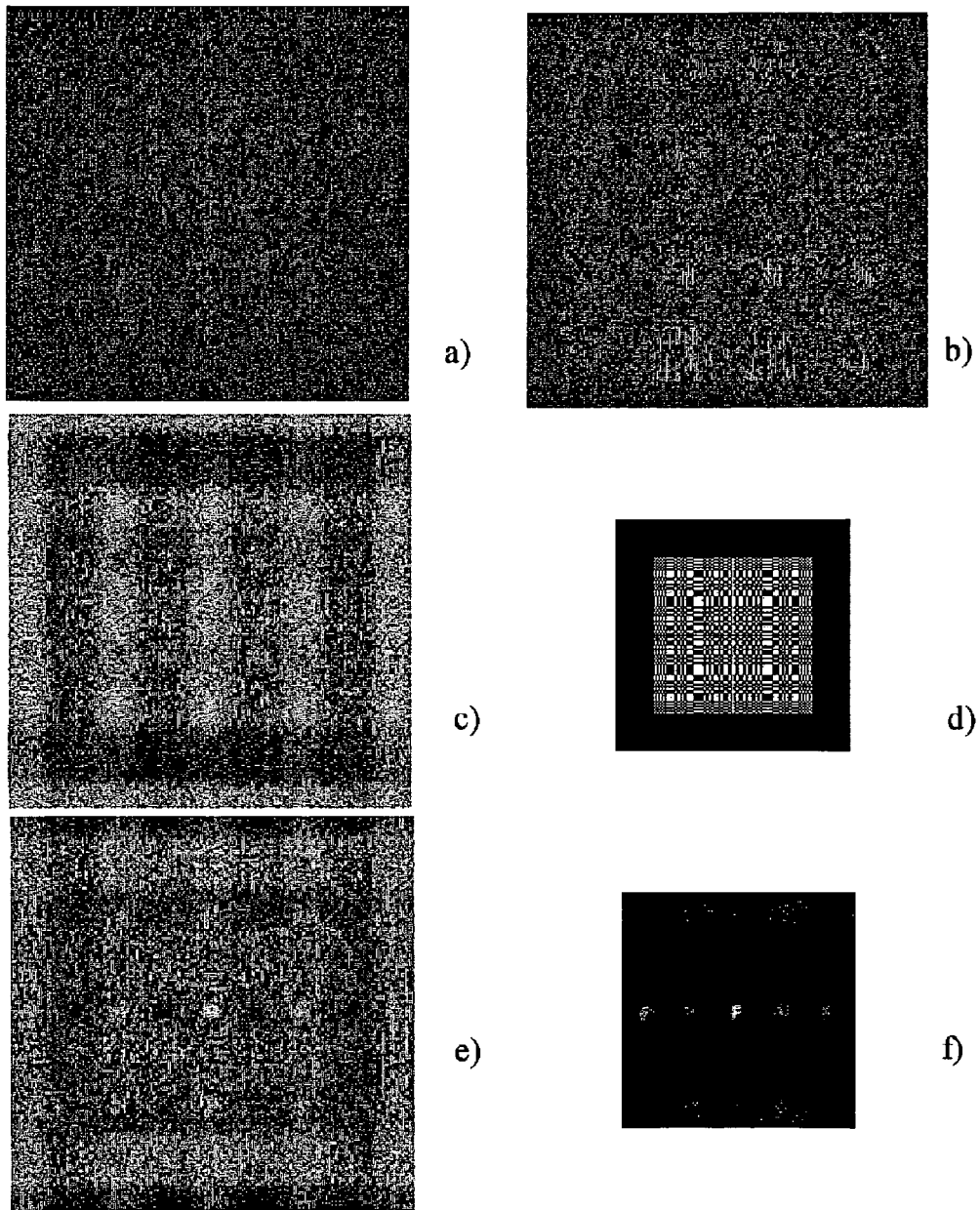
FIG. 21 contains a set of images illustrating diffractive coded-aperture imaging of transparency "F", specifically: a) a diffraction on FPA from a "positive" coded-aperture mask; b) the same with complementary mask; c) the difference of the foregoing two diffraction patterns; d) the coded-aperture mask; e) the digital hologram—correlation of the differential diffraction pattern with the mask; and f) the output of digital reconstruction of the hologram.
Figure 22:
FIG. 22 contains images illustrating single-frame reconstructions comparable to differential-frame reconstructions of FIGS. 20 and 21.

Numerical modeling of coded aperture imaging according to this invention is illustrated by FIG. 19. Experimental implementation demonstration of coded aperture imaging according to this invention is illustrated by FIGS. 20-22. FIGS. 20 and 21 show experimental results with subtraction (earlier steps 2a and 2b) of two FPA frames captured with complementary coded-aperture masks, formed on a liquid-crystal micro display. FIG. 22 shows single-frame reconstructions, performed from a single FPA frame, without this optional step of subtracting the frames captured with complementary coded-aperture masks.

It is important to reemphasize that throughout this disclosure, the processing of the diffracted projection of the target scene passed through the coded aperture can employ a variety of physical optical and/or virtual digital techniques and methods. Thus, when this disclosure and its associated claims make reference, for example not limitation, to using a reconstructing wavefront for holographic reconstructing, it is understood that the reconstructing wavefront can be a real physical wavefront, or a virtual wavefront which is effectively a digital simulation. Thus, for another example without limitation, when this disclosure and its associated claims speak of passing a wavefront through a complement of the coded aperture mask, it is understood that this complement may be a physical mask, and/or it may be a virtual mask which is digitally represented/simulated. And, it is understood that the passage of light through this mask may similarly be a real, physical passage of light through a real, physical mask, or that this may all take place virtually, by computerized digital simulation and processing. For another example without limitation, when reference is made to "focusing" light, it is understood that this may be implemented with physical lenses or similar optical elements, and/or with digital representations of lenses/optical elements and of the passage of light through these lenses/optical elements. More broadly, it is again to be emphasized that for many of the processing steps disclosed and claimed herein, the implementation of that step may be real and physical, and/or it may be virtual and digitally simulated, and that there is no limitation to be inferred to one or the other form of implementation unless such a limitation is explicitly stated or recited. The only step which is always a real, physical step, is the passing of light from the target scene through the coded aperture mask onto the focal plane, for it is this physical image that all of the remaining processing steps are motivated to reconstruct, via a variety of processes which may be physical/optical, digital/virtual, or both.

While the foregoing written description of the invention enables one of ordinary skill to make and use what is considered presently to be the best mode of this invention in various embodiment, those of ordinary skill will understand and appreciate the existence of variations, combinations, and equivalents of the specific embodiment, method, and examples herein. The invention should therefore not be limited by the above described embodiments, methods, and examples, but should encompass all embodiments and methods within the scope and spirit of the invention as claimed. Thus, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. A method for coded aperture sensing, comprising:
   passing at least one scene wavefront from a target scene through at least one original binary coded aperture mask comprising transparent and opaque portions thereof, onto a focal plane array, producing a diffracted projection of the target scene; and processing said diffracted projection into a representation of the target scene by correlating a function of said diffracted projection with a function of a known array pattern of said at least one original binary coded aperture mask and by using at least one reconstructing wavefront for holographic reconstructing.

2. The method of claim 1, said function of said known array pattern of said at least one original binary coded aperture mask comprising a complement of said at least one original binary coded aperture mask.

3. The method of claim 1, wherein:
said correlating occurs before said holographic reconstructing;
said correlating produces a hologram of the target scene;
said holographic reconstructing comprises Fresnel illuminating said hologram into a holographic reconstruction of the target scene.

4. The method of claim 3, further comprising focusing said holographic reconstruction onto an image plane, producing an image of the target scene.

5. The method of claim 1, further comprising:
passing at least one scene wavefront from a target scene through a complement of said at least one original binary coded aperture mask, producing a complementary diffracted projection of the target scene; wherein:
said function of said diffracted projection comprises a difference between said diffracted projection, and said complementary diffracted projection.

6. The method of claim 1, wherein:
said correlating occurs before said holographic reconstructing;
said correlating produces a hologram of the target scene; and
said holographic reconstructing comprises illuminating said hologram into a holographic reconstruction of said target scene; further comprising:
propagating said holographic reconstruction onto an image plane and calculating intensity at points of said image plane, producing an image of the target scene.

7. The method of claim 1, said function of said diffracted projection comprising a portion of said diffracted projection.

8. The method of claim 1, said function of said known array pattern of said at least one original binary coded aperture mask comprising a morphed pattern of said at least one original coded aperture mask.

9. The method of claim 1, wherein:
said holographic reconstructing occurs before said correlating;
said holographic reconstructing comprises illuminating said diffracted projection of the target scene as a hologram of said diffracted projection to produce a pattern image; and
said correlating comprises correlating said pattern image of said hologram with said function of said known array pattern of said at least one original binary coded aperture mask, producing an image of the target scene.

10. The method of claim 1, further comprising:
said function of said diffracted projection comprising said diffracted projection;
said function of said known array pattern of said at least one original binary coded aperture mask comprising a prerecorded impulse response comprising a complex field produced by passing a wavefront through said at least one original binary coded aperture mask onto said focal plane array; and
correlating said diffracted projection with said impulse response to produce an image of the target scene.

11. The method of claim 1, wherein:
said correlating occurs before said holographic reconstructing;
said correlating produces a hologram of the target scene; and
said holographic reconstructing comprises illuminating said hologram using an array of light sources arranged in a pattern complementary to said at least one original binary coded aperture mask, to produce a holographic reconstruction of the target scene; further comprising:
focusing said holographic reconstruction onto an image plane, produces an image of the target scene.

12. The method of claim 3, said correlating comprising correlating using deconvolution.

13. The method of claim 6, said correlating comprising correlating using deconvolution.

14. The method of claim 9, said correlating comprising correlating using deconvolution.

15. The method of claim 10, said correlating comprising correlating using deconvolution.

16. The method of claim 2, further comprising:
a polarizing coded aperture mask comprising both original mask polarizers with a first polarization orientation and complementary mask polarizers with a second polarization orientation; wherein:
diffracted projections produced by said original mask polarizers and diffracted projections produced by said complementary mask polarizers are respectively separated into said diffracted projection of the target scene and a complementary diffracted projection of the target scene.

17. The method of claim 2, further comprising:
a diffraction grating coded aperture mask comprising both original mask grating rulings and complementary mask grating; wherein:
diffracted projections produced by said original mask grating rulings and diffracted projections produced by said complementary mask grating rulings are respectively separated into said diffracted projection of the target scene and a complementary diffracted projection of the target scene.

18. The method of claim 2, further comprising:
a refractive coded aperture mask comprising both original mask refractive elements and complementary mask refractive elements; wherein:
diffracted projections produced by said original mask refractive elements and diffracted projections produced by said complementary mask refractive elements are respectively separated into said diffracted projection of the target scene and a complementary diffracted projection of the target scene.

19. The method of claim 2, further comprising:
a mixed transparent and reflective coded aperture mask comprising both transparent and reflective elements; wherein:
diffracted projections produced by said transparent elements and diffracted projections produced by said reflective elements are separated into said diffracted projection of the target scene and a complementary diffracted projection of the target scene.

20. The method of claim 2, further comprising:
a dynamic coded aperture mask for forming in sequence, both said at least one original binary coded aperture mask and said complement of said at least one original binary coded aperture mask; wherein:
diffracted projections produced by said at least one original binary coded aperture mask and diffracted projections produced by said complement of said at least one original binary coded aperture mask are respectively separated into said diffracted projection of the target scene and a complementary diffracted projection of the target scene.

21. The method of claim 1, said using at least one reconstructing wavefront for holographic reconstructing comprising increasing spatial resolution by narrowing a spectral range with a filter selected from the filter group consisting of: bandpass filters and notch filters.

22. The method of claim 1, said using at least one reconstructing wavefront for holographic reconstructing comprising:
using a plurality of reconstructing wavefronts of different wavelengths to focus different spectral components of the holographic reconstruction; and
combining said different spectral components of said holographic reconstruction, producing a hyperspectral image of the target scene.

23. The method of claim 1, said using at least one reconstructing wavefront for holographic reconstructing comprising applying a change detection algorithm to said representation of the target scene.

24. The method of claim 23, wherein said representation of the target scene is denoted by h(x,y), said change detection algorithm comprising:
producing a shifted image of said representation of the target scene denoted by h'(x, y), such that:

$$h'(x,y) = h(x-a, y-b) + g(x,y),$$

where g(x,y) denotes a difference between said representation of the target scene and said shifted image of said representation of the target scene;
detecting said difference g(x,y), using a first Fourier filter $$F_1(p, q) = \frac{1}{H(p, q) + 1},$$

where H(p,q) is the Fourier transform of the function h(x, y), using a second Fourier filter $$F_2(p,q) = H(p,q),$$

and using a nonlinear filter N(·); by:
starting with h'(x,y) and applying $F_1(p,q)$ followed by N(·) followed by $F_2(p,q)$, and then subtracting off the shifted h'(x,y) to yield g(x,y).

25. The method of claim 1, wherein said at least one original binary coded aperture mask and said focal plane array are substantially parallel to one another.

26. The method of claim 1, wherein said at least one original binary coded aperture mask and said focal plane array are substantially not parallel to one another.

27. The method of claim 1, further comprising at least one optical element for concentrating said at least one scene wavefront onto said focal plane array to reduce wavefront loss.

28. The method of claim 1, wherein said at least one original binary coded aperture mask is substantially planar.

29. The method of claim 1, wherein said at least one original binary coded aperture mask is substantially non-planar.

30. The method of claim 29, wherein a shape of said at least one original binary coded aperture mask is conformal.

31. The method of claim 2, further comprising:
a polarimetric coded aperture mask comprising all four of:
opaque elements; transparent elements polarized in a first polarization orientation; transparent elements polarized in a second polarization orientation; and unpolarized transparent elements transparent to said first polarization orientation and said second polarization orientation; wherein said transparent elements and said opaque elements are arranged in statistically independent patterns; and
processing said diffracted projection into a representation of the target scene in said first and second polarization orientations by correlating a function of said diffracted projection with a function of the pattern of said transparent elements, respectively, in said first and second polarization orientations, and for each polarization orientation, by using at least one reconstructing wavefront for holographic reconstructing.

32. The method of claim 1, further comprising compensating for known aberrations introduced by system optics used between the target scene and said original binary coded aperture mask, by subtracting said known aberrations from the holographic reconstruction, to produce an aberration-compensated holographic reconstruction.

33. The method of claim 1, further comprising compensating for known aberrations introduced by system optics used between the target scene and said original binary coded aperture mask, by:
remapping a digital pattern of said original binary coded aperture mask, as a function of said known aberrations; and
using the remapped digital pattern for said holographic reconstructing, to produce an aberration-compensated holographic reconstruction.

34. The method of claim 1, further comprising compensating for unknown aberrations introduced by system optics used between the target scene and said original binary coded aperture mask, by a calibration procedure comprising:
passing at least one calibration wavefront through said system optics in combination with said at least one original binary coded aperture mask onto the focal plane array, producing an aberrated diffracted projection of a source of said calibration wavefront;
deducing a measured system optics aberration from said aberrated diffracted projection; and
subtracting said measured system optics aberration during processing of said diffracted projection of the target scene, to produce an aberration-compensated holographic reconstruction.

35. The method of claim 1, further comprising compensating for unknown atmospheric aberrations introduced between the target scene and said original binary coded aperture mask, by computationally maximizing a sharpness function during processing of said diffracted projection of the target scene, to produce an aberration-compensated holographic reconstruction.

36. The method of claim 1, further comprising compensating for unknown atmospheric aberrations introduced between the target scene and said original binary coded aperture mask, by:
subdividing at least one wavefront of the holographic reconstruction, into a plurality of coherent sub-wavefronts, each smaller than Fried's parameter;
computationally refocusing each sub-wavefront to produce corresponding object images;
correlating said object images to calculate shifts and tilts of the corresponding sub-wavefronts, caused by the atmospheric turbulence;
removing the calculated shifts and tilts to produce a corresponding plurality of corrected sub-wavefronts; and coherently combining said corrected sub-wavefronts, to produce an aberration-compensated holographic reconstruction.

37. A system for coded aperture sensing, comprising requisite optical elements, computerized storage and computerized processing for:
   passing at least one scene wavefront from a target scene through at least one original binary coded aperture mask comprising transparent and opaque portions thereof, onto a focal plane array, producing a diffracted projection of the target scene; and
   processing said diffracted projection into a representation of the target scene by correlating a function of said diffracted projection with a function of a known array pattern of said at least one original binary coded aperture mask and by using at least one reconstructing wavefront for holographic reconstructing.

38. The system of claim 37, said function of said known array pattern of said at least one original binary coded aperture mask comprising a complement of said at least one original binary coded aperture mask.

39. The system of claim 37, wherein:
   said correlating occurs before said holographic reconstructing;
   said correlating produces a hologram of the target scene;
   said holographic reconstructing comprises Fresnel illuminating said hologram into a holographic reconstruction of the target scene.

40. The system of claim 39, further comprising said requisite optical elements, computerized storage and computerized processing for focusing said holographic reconstruction onto an image plane, producing an image of the target scene.

41. The system of claim 37, further comprising said requisite optical elements, computerized storage and computerized processing for:
   passing at least one scene wavefront from a target scene through a complement of said at least one original binary coded aperture mask, producing a complementary diffracted projection of the target scene; wherein:
   said function of said diffracted projection comprises a difference between said diffracted projection, and said complementary diffracted projection.

42. The system of claim 37, wherein:
   said correlating occurs before said holographic reconstructing;
   said correlating produces a hologram of the target scene; and
   said holographic reconstructing comprises illuminating said hologram into a holographic reconstruction of said target scene; further comprising said requisite optical elements, computerized storage and computerized processing for:
   propagating said holographic reconstruction onto an image plane and calculating intensity at points of said image plane, producing an image of the target scene.

43. The system of claim 37, said function of said diffracted projection comprising a portion of said diffracted projection.

44. The system of claim 37, said function of said known array pattern of said at least one original binary coded aperture mask comprising a morphed pattern of said at least one original binary coded aperture mask.

45. The system of claim 37, wherein:
   said holographic reconstructing occurs before said correlating;
   said holographic reconstructing comprises illuminating said diffracted projection of the target scene as a hologram of said diffracted projection to produce a pattern image; and
   said correlating comprises correlating said pattern image of said hologram with said function of said known array pattern of said at least one original binary coded aperture mask, producing an image of the target scene.

46. The system of claim 37, further comprising said requisite optical elements, computerized storage and computerized processing for:
   said function of said diffracted projection comprising said diffracted projection;
   said function of said known array pattern of said at least one original binary coded aperture mask comprising a prerecorded impulse response comprising a complex field produced by passing a wavefront through said at least one original binary coded aperture mask onto said focal plane array; and
   correlating said diffracted projection with said impulse response to produce an image of the target scene.

47. The system of claim 37, wherein:
   said correlating occurs before said holographic reconstructing;
   said correlating produces a hologram of the target scene; and
   said holographic reconstructing comprises illuminating said hologram using an array of light sources arranged in a pattern complementary to said at least one original binary coded aperture mask, producing a holographic reconstruction of the target scene; further comprising said requisite optical elements, computerized storage and computerized processing for:
   focusing said holographic reconstruction onto an image plane, to produce an image of the target scene.

48. The system of claim 39, further comprising said requisite optical elements, computerized storage and computerized processing for said correlating comprising correlating using deconvolution.

49. The system of claim 42, further comprising said requisite optical elements, computerized storage and computerized processing for said correlating comprising correlating using deconvolution.

50. The system of claim 45, further comprising said requisite optical elements, computerized storage and computerized processing for said correlating comprising correlating using deconvolution.

51. The system of claim 46, further comprising said requisite optical elements, computerized storage and computerized processing for said correlating comprising correlating using deconvolution.

52. The system of claim 38, further comprising:
   a polarizing coded aperture mask comprising both original mask polarizers with a first polarization orientation and complementary mask polarizers with a second polarization orientation; and:
   said requisite optical elements, computerized storage and computerized processing for respectively separating diffracted projections produced by said original mask polarizers and diffracted projections produced by said complementary mask polarizers into said diffracted projection of the target scene and a complementary diffracted projection of the target scene.

53. The system of claim 38, further comprising:
   a diffraction grating coded aperture mask comprising both original mask grating rulings and complementary mask grating; and said requisite optical elements, computerized storage and computerized processing for respectively separating diffracted projections produced by said original mask grating rulings and diffracted projections produced by said complementary mask grating rulings into said diffracted projection of the target scene and a complementary diffracted projection of the target scene.

54. The system of claim 38, further comprising:
a refractive coded aperture mask comprising both original mask refractive elements and complementary mask refractive elements; and
said requisite optical elements, computerized storage and computerized processing for respectively separating diffracted projections produced by said original mask refractive elements and diffracted projections produced by said complementary mask refractive elements into said diffracted projection of the target scene and a complementary diffracted projection of the target scene.

55. The system of claim 38, further comprising:
a mixed transparent and reflective coded aperture mask comprising both transparent and reflective elements; and
said requisite optical elements, computerized storage and computerized processing for separating diffracted projections produced by said transparent elements and diffracted projections produced by said reflective elements into said diffracted projection of the target scene and a complementary diffracted projection of the target scene.

56. The system of claim 38, further comprising:
a dynamic coded aperture mask for forming in sequence, both said at least one original binary coded aperture mask and said complement of said at least one original binary coded aperture mask; and
said requisite optical elements, computerized storage and computerized processing for respectively separating diffracted projections produced by said at least one original binary coded aperture mask and diffracted projections produced by said complement of said at least one original binary coded aperture mask into said diffracted projection of the target scene and a complementary diffracted projection of the target scene.

57. The system of claim 37, said using at least one reconstructing wavefront for holographic reconstructing comprising increasing spatial resolution by narrowing a spectral range with a filter selected from the filter group consisting of: bandpass filters and notch filters.

58. The system of claim 37, said using at least one reconstructing wavefront for holographic reconstructing comprising:
using a plurality of reconstructing wavefronts of different wavelengths to focus different spectral components of the holographic reconstruction; and
combining said different spectral components of said holographic reconstruction, producing a hyperspectral image of the target scene.

59. The system of claim 37, said using at least one reconstructing wavefront for holographic reconstructing comprising applying a change detection algorithm to said representation of the target scene.

60. The system of claim 59, wherein said representation of the target scene is denoted by h(x,y), said change detection algorithm comprising:
producing a shifted image of said representation of the target scene denoted by h'(x, y), such that:

$$h'(x,y) = h(x-a, y-b) + g(x,y),$$

where g(x,y) denotes a difference between said representation of the target scene and said shifted image of said representation of the target scene;
detecting said difference g(x,y), using a first Fourier filter $$F_1(p, q) = \frac{1}{H(p, q) + 1},$$

where H(p,q) is the Fourier transform of the function h(x, y), using a second Fourier filter $$F_2(p,q) = H(p,q),$$

and using a nonlinear filter N(·); by:
starting with h'(x,y) and applying $F_1(p,q)$ followed by N(·) followed by $F_2(p,q)$, and then subtracting off the shifted h'(x,y) to yield g(x,y).

61. The system of claim 37, wherein said at least one original binary coded aperture mask and said focal plane array are substantially parallel to one another.

62. The system of claim 37, wherein said at least one original binary coded aperture mask and said focal plane array are substantially not parallel to one another.

63. The system of claim 37, further comprising at least one optical element for concentrating said at least one scene wavefront onto said focal plane array to reduce wavefront loss.

64. The system of claim 37, wherein said at least one original binary coded aperture mask is substantially planar.

65. The system of claim 37, wherein said at least one original binary coded aperture mask is substantially nonplanar.

66. The system of claim 65, wherein a shape of said at least one original binary coded aperture mask is conformal.

67. The system of claim 38, further comprising:
a polarimetric coded aperture mask comprising all four of: opaque elements; transparent elements polarized in a first polarization orientation; transparent elements polarized in a second polarization orientation; and unpolarized transparent elements transparent to said first polarization orientation and said second polarization orientation; wherein said transparent elements and said opaque elements are arranged in statistically independent patterns; and
said requisite optical elements, computerized storage and computerized processing for processing said diffracted projection into a representation of the target scene in said first and second polarization orientations by correlating a function of said diffracted projection with a function of the pattern of said transparent elements, respectively, in said first and second polarization orientations, and for each polarization orientation, by using at least one reconstructing wavefront for holographic reconstructing.

68. The system of claim 37, further comprising said requisite optical elements, computerized storage and computerized processing for compensating for known aberrations introduced by at least one of said optical elements, used between the target scene and said original binary coded aperture mask, by subtracting said known aberrations from the holographic reconstruction, to produce an aberration-compensated holographic reconstruction.

69. The system of claim 37, further comprising said requisite optical elements, computerized storage and computerized processing for compensating for known aberrations introduced by at least one of said optical elements, used between the target scene and said original binary coded aperture mask, by:
- remapping a digital pattern of said original binary coded aperture mask, as a function of said known aberrations; and
- using the remapped digital pattern for said holographic reconstructing, to produce an aberration-compensated holographic reconstruction.

70. The system of claim 37, further comprising said requisite optical elements, computerized storage and computerized processing for compensating for unknown aberrations introduced by at least one of said optical elements, used between the target scene and said original binary coded aperture mask, by a calibration procedure comprising:
- passing at least one calibration wavefront through said at least one of said optical elements in combination with said at least one original binary coded aperture mask, onto the focal plane array, producing an aberrated diffracted projection of a source of said calibration wavefront;
- deducing a measured aberration due to said at least one of said optical elements, from said aberrated diffracted projection; and
- subtracting said measured aberration due to said at least one of said optical elements, during processing of said diffracted projection of the target scene, to produce an aberration-compensated holographic reconstruction.

71. The system of claim 37, further comprising said requisite optical elements, computerized storage and computerized processing for compensating for unknown atmospheric aberrations introduced between the target scene and said original binary coded aperture mask, by computationally maximizing a sharpness function during processing of said diffracted projection of the target scene, to produce an aberration-compensated holographic reconstruction.

72. The system of claim 37, further comprising said requisite optical elements, computerized storage and computerized processing for compensating for unknown atmospheric aberrations introduced between the target scene and said original binary coded aperture mask, by:
- subdividing at least one wavefront of the holographic reconstruction, into a plurality of coherent sub-wavefronts, each smaller than Fried's parameter;
- computationally refocusing each sub-wavefront to produce corresponding object images;
- correlating said object images to calculate shifts and tilts of the corresponding sub-wavefronts, caused by the atmospheric turbulence;
- removing the calculated shifts and tilts to produce a corresponding plurality of corrected sub-wavefronts; and
- coherently combining said corrected sub-wavefronts, to produce an aberration-compensated holographic reconstruction.

* * * * *